United States Patent
Zeng et al.

(10) Patent No.: US 12,543,954 B2
(45) Date of Patent: Feb. 10, 2026

(54) WATER JET LIGHT GUIDE FOR IN-VIVO SPECTROSCOPY

(71) Applicant: Provincial Health Services Authority, Vancouver (CA)

(72) Inventors: Haishan Zeng, Vancouver (CA); Michael Short, Vancouver (CA); Yunxian Tian, Vancouver (CA)

(73) Assignee: Provincial Health Services Authority, Vancouver (CA)

( * ) Notice: Subject to any disclaimer, the term of this patent is extended or adjusted under 35 U.S.C. 154(b) by 47 days.

(21) Appl. No.: 18/415,664

(22) Filed: Jan. 18, 2024

(65) Prior Publication Data
US 2024/0225452 A1 Jul. 11, 2024

Related U.S. Application Data

(63) Continuation of application No. PCT/CA2022/051152, filed on Jul. 26, 2022.

(60) Provisional application No. 63/225,616, filed on Jul. 26, 2021.

(51) Int. Cl.
*A61B 5/00* (2006.01)
*G01N 21/3563* (2014.01)
*G01N 21/64* (2006.01)
*G01N 21/65* (2006.01)

(52) U.S. Cl.
CPC .......... *A61B 5/0075* (2013.01); *A61B 5/0086* (2013.01); *G01N 21/3563* (2013.01); *G01N 21/6486* (2013.01); *G01N 21/65* (2013.01); *A61B 2562/0233* (2013.01); *G01N 2201/08* (2013.01)

(58) Field of Classification Search
CPC ................ A61B 5/0075; A61B 5/0086; A61B 2562/0233; G01N 21/3563; G01N 21/6486; G01N 21/65; G01N 2201/08
See application file for complete search history.

(56) References Cited

U.S. PATENT DOCUMENTS

| | | | | |
|---|---|---|---|---|
| 6,437,326 | B1 * | 8/2002 | Yamate | E21B 49/08 |
| | | | | 250/269.1 |
| 7,002,142 | B2 * | 2/2006 | Mullins | G01N 33/241 |
| | | | | 250/269.1 |
| 2003/0062472 | A1 * | 4/2003 | Mullins | G01N 21/3504 |
| | | | | 250/269.1 |

(Continued)

OTHER PUBLICATIONS

Persichetti et al.; "Optofluidic jet waveguide enhanced Raman spectroscopy"; Sensors and Actuators B 207 (2015) 732-739 (Year: 2015).*

(Continued)

*Primary Examiner* — Dixomara Vargas
(74) *Attorney, Agent, or Firm* — Todd A. Rattray; Oyen Wiggs Green & Mutala LLP

(57) ABSTRACT

A system useful for in vivo and ex vivo spectroscopy comprises a water source connected to supply water through a passage to an outlet at a flow rate sufficient to issue a laminar water jet from the outlet, a light source operative to emit a light beam that is guided to a sample by the water jet, and an analysis unit connected to receive collected light that has been emitted from the sample into the water jet and operable to analyze the collected light. Some embodiments provide endoscopes with integrated light guides.

20 Claims, 13 Drawing Sheets

(56) References Cited

U.S. PATENT DOCUMENTS

| | | | | |
|---|---|---|---|---|
| 2007/0263207 | A1* | 11/2007 | Mertz | G01N 21/05 |
| | | | | 356/300 |
| 2008/0030730 | A1* | 2/2008 | Clark | G01N 33/18 |
| | | | | 356/338 |
| 2010/0059669 | A1* | 3/2010 | Jamaluddin | E21B 49/08 |
| | | | | 250/269.1 |
| 2015/0041682 | A1* | 2/2015 | Cano | G01N 21/64 |
| | | | | 250/461.1 |
| 2017/0022804 | A1* | 1/2017 | Gupta | C25B 11/081 |
| 2017/0135677 | A1* | 5/2017 | Hall | A61B 10/007 |
| 2017/0322197 | A1* | 11/2017 | Hall | G01N 33/493 |
| 2020/0209208 | A1* | 7/2020 | Li | H01L 25/0753 |
| 2023/0008231 | A1* | 1/2023 | Lancuba | G01J 3/0208 |
| 2024/0167953 | A1* | 5/2024 | Sandoghdar | G01N 15/1484 |
| 2024/0287902 | A1* | 8/2024 | Jones | E21B 49/08 |
| 2024/0328928 | A1* | 10/2024 | Zhu | G03H 1/0005 |

OTHER PUBLICATIONS

Persichetti et al.; "Water monitoring by optofluidic Raman spectroscopy for in situ applications"; Talanta 155 (2016) 145-152 (Year: 2016).*

Tauber et al.; "Flowing liquid sample jet for resonance Raman and ultrafast optical spectroscopy"; Rev. Sci. Instrum., vol. 74, No. 11, Nov. 2003 (Year: 2003).*

Spiegel et al.; "High efficiency Raman scattering in micrometer-sized water jets"; Opt. Eng. 43(2) 450-454 (Feb. 2004) (Year: 2004).*

Persichetti et al.; "Multifunctional optofluidic lab-on-chip platform for Raman and fluorescence spectroscopic microfluidic analysis"; Lab Chip, 2017, 17, 2631-2639 (Year: 2017).*

Persichetti et al. "Liquid Jet Waveguide/or Spectroscopic Sensors", 2014 Fotonica AEIT Italian Conference on Photonics Technologies, pp. 1-4, May 2014.

Sander et al. "An Nd:YAG laser with a water-guided laser beam—a new transmission system", Gastrointestinal Endoscopy, vol. 34, Issue 4, pp. 336-338, 1988.

Gregory et al. "Liquid Core Light Guide for Laser Angioplasty", in IEEE Journal of Quantum Electronics, vol. 26, No. 12, pp. 2289-2296, Dec. 1990.

* cited by examiner

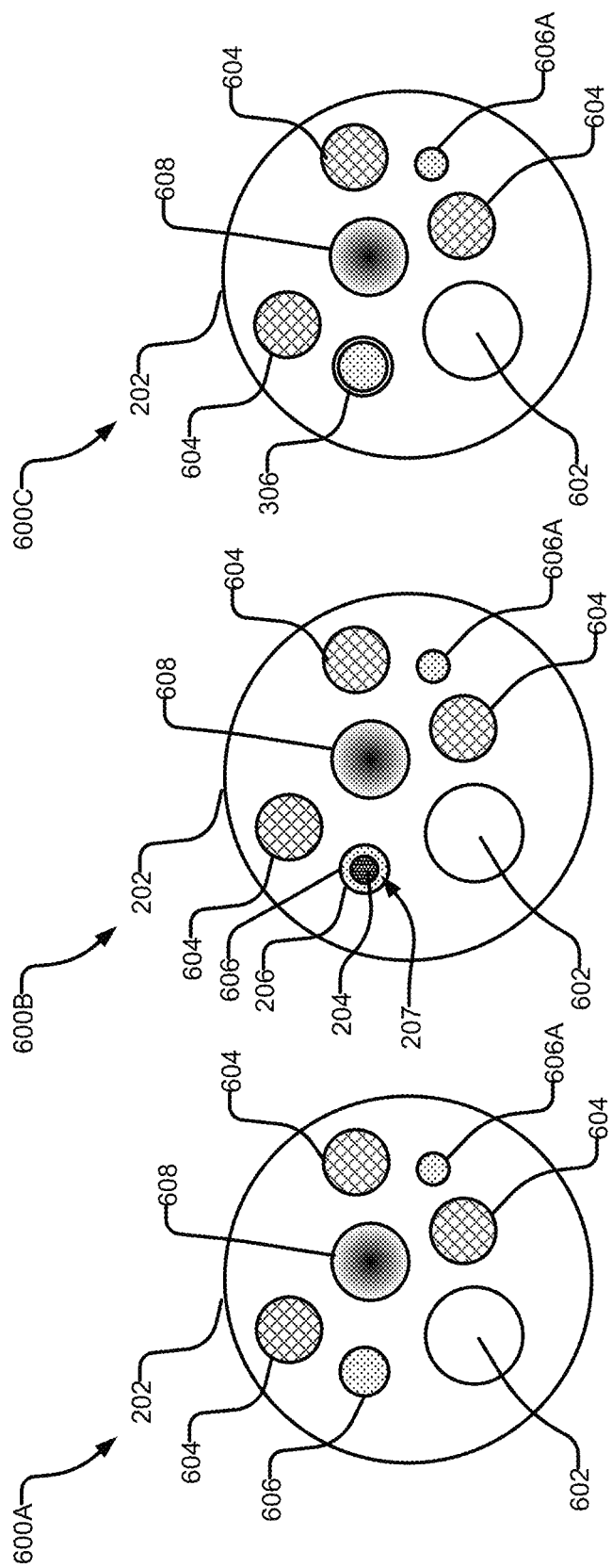

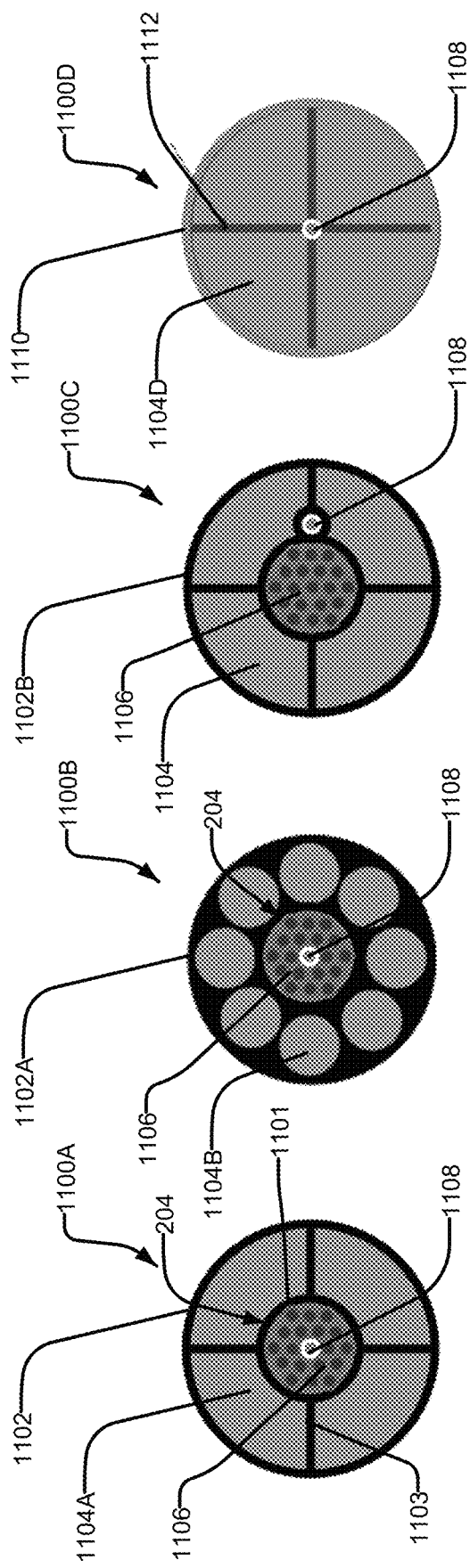

WATER JET LIGHT GUIDE FOR IN-VIVO SPECTROSCOPY

CROSS-REFERENCE TO RELATED APPLICATIONS

This application claims priority from U.S. application No. 63/225,616 filed 26 Jul. 2021 and entitled COMBINING ENDOSCOPIC WIDE FIELD IMAGING AND RAMAN SPECTROSCOPY ACQUIRED USING A NOVEL WATER JET LIGHT GUIDE which is hereby incorporated herein by reference for all purposes. For purposes of the United States of America, this application claims the benefit under 35 U.S.C. § 119 of U.S. application No. 63/225,616 filed 26 Jul. 2021 and entitled COMBINING ENDOSCOPIC WIDE FIELD IMAGING AND RAMAN SPECTROSCOPY ACQUIRED USING A NOVEL WATER JET LIGHT GUIDE.

FIELD

This invention relates to in vivo spectroscopy of tissues. Some example embodiments provide instruments that include a water jet which acts as a light guide to collect light for analysis. In some example embodiments the collected light is analyzed to provide a Raman spectrum. The technology has example application for detecting pre-cancer or cancerous tissues.

BACKGROUND

Optical spectrometry of living tissues has a wide range of applications. These include detecting pre-cancer or cancerous tissues and monitoring for signatures that can be useful for diagnosis of other conditions. A wide range of types of spectrometry have been applied for medical diagnosis and imaging. These include, without limitation: fluorescence spectrometry, Raman spectrometry, multi-photon spectrometry, and others.

Raman spectroscopy (RS) is a powerful spectroscopic technique that is based on inelastic interaction between light and molecules. This phenomenon is called Raman scattering and the scattered light collected in RS is often referred to as Raman spectra. Raman scattering of tissue offers a wealth of information about the vibrational structure of the compositional proteins, lipids, and nucleic acids of the tissue. RS has been used to improve the diagnosis techniques for many conditions because of its high specificity to individual molecules. For example, Raman spectroscopy has been applied for detecting a variety of diseases, including malignant tumors in lung tissue and colorectal tissue both ex vivo and in vivo.

Some challenges remain for the practical implementation of a reliable non-invasive RS measurement for tissue diagnosis. Conventional RS techniques suffer from weak signals and/or interferences from strong fluorescence backgrounds. These factors often limit the signal to noise ratio (SNR).

Despite the inherent difficulty, consistent sampling geometry is essential in collecting good quality Raman spectra. One typical approach in RS endoscopy is to make direct contact measurement of tissue. However, direct contact results in increased risk of damaging the tissue especially for colon or lung tissue. Another drawback of making direct contact measurement is that varying pressure applied to the tissue may lead to signals being collected at different depths. These issues can decrease the predictive accuracy of RS measurements and may make it undesirably time consuming to acquire Raman spectra procedure due to the potential need for repeated measurements.

An alternative approach is to keep a distance (e.g. d=10 mm) between probe and tissue. This is helpful in accommodating imperfect centering during endoscopy and the non-uniform surface topology of human tissue. However, this contact-free approach also has drawbacks. First, data consistency is often compromised since the distance between the probe and the tissue is typically manually controlled by the clinician with visual feedback from a real-time endoscopic video imaging in RS colonoscopy, or from auto-fluorescence bronchoscopy. Second, the collection efficiency is reduced by increasing the distance between the probe and the tissue.

Therefore, there remain a desire for an improved implementation of spectroscopy techniques to improve overall efficiency and reliability of spectroscopy. Additionally, a spectroscopy measurement conducted without the use of a probe or catheter going through the instrumental channel or biopsy channel is also highly desirable. The contact-free probe may implement a spectroscopy measurement conducted without the use of a probe or catheter. However, such an implementation will suffer from all of the same disadvantages as discussed above.

SUMMARY

This invention has a number of aspects. These include without limitation:
 spectrometry systems;
 spectrometry methods; and
 endoscopes.

In some embodiments the systems are configured to for performing spectrometry of living tissues. For example the systems may include endoscopes that facilitate spectroscopic analysis of lung tissue, colon tissue or tissues of the throat or stomach. Some embodiments include a water jet that serves as a light guide to collect light from a sample and to couple the collected light into a light guide for delivery to an analysis unit. Such systems can be particularly advantageous for modes of spectrometry in which the collected light is low in intensity. Some examples of such modes of spectroscopy are Raman spectroscopy and two-photon or multi-photon spectroscopy.

An example aspect of the invention provides a system useful for in vivo and ex vivo spectroscopy. The system comprises a water source connected to supply water through a passage to an outlet at a flow rate sufficient to issue a laminar water jet from the outlet. A light source is operative to emit light as a light beam that is guided to a sample by the water jet. An analysis unit is connected to receive collected light that has been emitted from the sample into the water jet and operable to analyze the collected light.

In some embodiments the water source is configured to deliver the water at a flow rate corresponding to a velocity of the water in the water jet being in the range of 0.1 to 0.15 m/s.

In some embodiments the water source is configured to deliver the water at a flow rate in the range of about 3.0 to 4.5 ml/s.

In some embodiments the water source comprises a pump configured to deliver the water into the passage.

In some embodiments the water source comprises a pressure regulator.

In some embodiments the system comprises an orientation sensor operable to provide an output signal indicating an orientation of the outlet wherein the water source is configured to vary a flow rate of the water supplied to the passage in response to the output signal from the orientation sensor.

In some embodiments the outlet is configured to provide the water jet having a diameter of 3 mm±30%.

In some embodiments a diameter of the water jet is constant to within 20% over a distance of 0 to 30 mm from the outlet.

In some embodiments the light emitted by the light source is infrared light.

In some embodiments the light emitted by the light source and the collected light have different wavelengths.

In some embodiments the analysis unit comprises a Raman spectrometer operable to output a Raman spectrum of the collected light.

In some embodiments the light source comprises a laser.

In some embodiments the system comprises an endoscope and the passage extends along the endoscope and the light emitted by the light source and the collected light are each guided along the endoscope. The endoscope may comprise a plurality of lumens wherein the passage extends through one of the plurality of lumens. An inner surface of the one of the plurality of lumens may be lined with a material (e.g. Teflon AF™ or polytetrafluoroethylene) having a refractive index much less than that of water such that the water filled passage guides the collected light along the endoscope toward the analysis unit.

In some embodiments the system comprises a light guide that extends within the passage to a location at or near the outlet and the light beam from the light source is coupled into the light guide. Some such embodiments include centralizing elements that center the light guide within the passage.

In some embodiments the light guide is arranged to receive the collected light from the water jet and to guide the collected light along the endoscope toward the analysis unit.

In some embodiments the system comprises a directional optical coupler connected to couple the light from the light source into the light guide and to couple the collected light out of the light guide.

In some embodiments the light guide comprises a plurality of optical fibers.

In some embodiments the light source is optically coupled to deliver the light from the light source into one or more first ones of the plurality of optical fibers and one or more second ones of the optical fibers are optically coupled to deliver the collected light to the analysis unit.

In some embodiments the light guide comprises a silica Raman probe.

In some embodiments the system comprises a second light source optically connected to emit a second light beam that is guided to the sample by the water jet. The second light source may, for example comprise a white light source.

In some embodiments the system comprises a third light source optically connected to emit a third light beam that is guided to the sample by the water jet. The third light beam may for example comprise light having a wavelength that excites fluorescence in tissue (e.g. blue light such as light having a wavelength of about 405 nm).

In some embodiments the system comprises a second analysis unit optically connected to receive a portion of the collected light corresponding to the third light beam and operable to analyze the portion of the collected light corresponding to the third light beam. The second analysis unit may, for example, comprise a fluorescence spectrometer operable to output a fluorescence spectrum for the portion of the collected light.

Another aspect of the invention provides a method for spectroscopy of a sample. In some embodiments the sample is made of living tissue. In some embodiments the tissue is lung tissue or colon tissue. The method comprises: delivering water from a water source through a passage to an outlet at a flow rate sufficient to issue a laminar water jet from the outlet; delivering a light beam from a light source into the water jet; directing collected light from the sample that has been collected and guided by the water jet to an analysis unit; and operating the analysis unit to analyze the collected light.

In some embodiments the collected light comprises Raman scattered light, the analysis unit comprises a Raman spectrometer and analyzing the collected light comprises producing a Raman spectrum of the collected light.

In some embodiments the outlet is not in contact with the sample.

In some embodiments the outlet is spaced apart from the sample by a distance of 50 mm or less.

In some embodiments the method comprises maintaining a velocity of the water in the water jet in the range of about 0.1 to 0.15 m/s.

In some embodiments the method comprises delivering the water to the water jet at a flow rate in the range of about 3.0 to 4.5 ml/s.

In some embodiments the method comprises guiding the collected light along the passage by total internal reflection at an interface between the water in the passage and a wall of the passage.

In some embodiments the sample is lung or colon tissue and the method comprises delivering the water to the water jet and delivering the collected light to the analysis unit by way of an endoscope.

In some embodiments the endoscope comprises an instrument channel and the method comprises delivering the water to the water jet and delivering the collected light to the analysis unit though a lumen that is separate from the instrument channel.

Another aspect of the invention provides an endoscope comprising: an elongated casing having an instrument channel extending longitudinally along the casing to a distal end of the casing; and a light guide extending along the casing to the distal end of the casing in a lumen separate from the instrument channel, the light guide configured to deliver collected light received by the waveguide at the distal end of the endoscope to a proximal end of the light guide which is connectable to deliver the collected light to an analysis unit.

In some embodiments the light guide comprises a water-filled passage having walls of a material that has an index of refraction significantly less than the index of refraction of water.

In some embodiments the endoscope comprises a water inlet connected to supply water into the water filled passage at a proximal location and an outlet in fluid connection with the passage at the distal end of the endoscope.

In some embodiments the material of the wall of the water filled passage has an index of refraction of 1.29 or less.

In some embodiments the wherein the material of the wall of the water filled passage comprises Teflon AF™.

In some embodiments the light guide comprises an optical fiber extending along the water filled passage.

In some embodiments, the endoscope comprises centralizing members arranged to support the optical fiber centered in the light guide.

In some embodiments the centralizing members are non-Raman emitting.

In some embodiments the light guide comprises a silica Raman probe.

In some embodiments the light guide has a diameter of 2.5 mm or less.

Another aspect of the invention provides apparatus having any new and inventive feature, combination of features, or sub-combination of features as described herein (including any combination of features of any of the above aspects).

Another aspect of the invention provides methods having any new and inventive steps, acts, combination of steps and/or acts or sub-combination of steps and/or acts as described herein.

Further aspects and example embodiments are illustrated in the accompanying drawings and/or described in the following description.

It is emphasized that the invention relates to all combinations of the above features, even if these are recited in different claims.

BRIEF DESCRIPTION OF THE DRAWINGS

The accompanying drawings illustrate non-limiting example embodiments of the invention.

FIG. 6A schematically illustrates the distal end of a typical endoscope.

FIGS. 6B and 6C schematically illustrate distal end arrangements that may be provided in endoscopes of the types shown in FIG. 2 and FIG. 3 respectively.

FIGS. 11A to 11D are cross section views of tubes that include features for supporting light guides while allowing area for water flow around the light guides.

DETAILED DESCRIPTION

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

Figure 1:
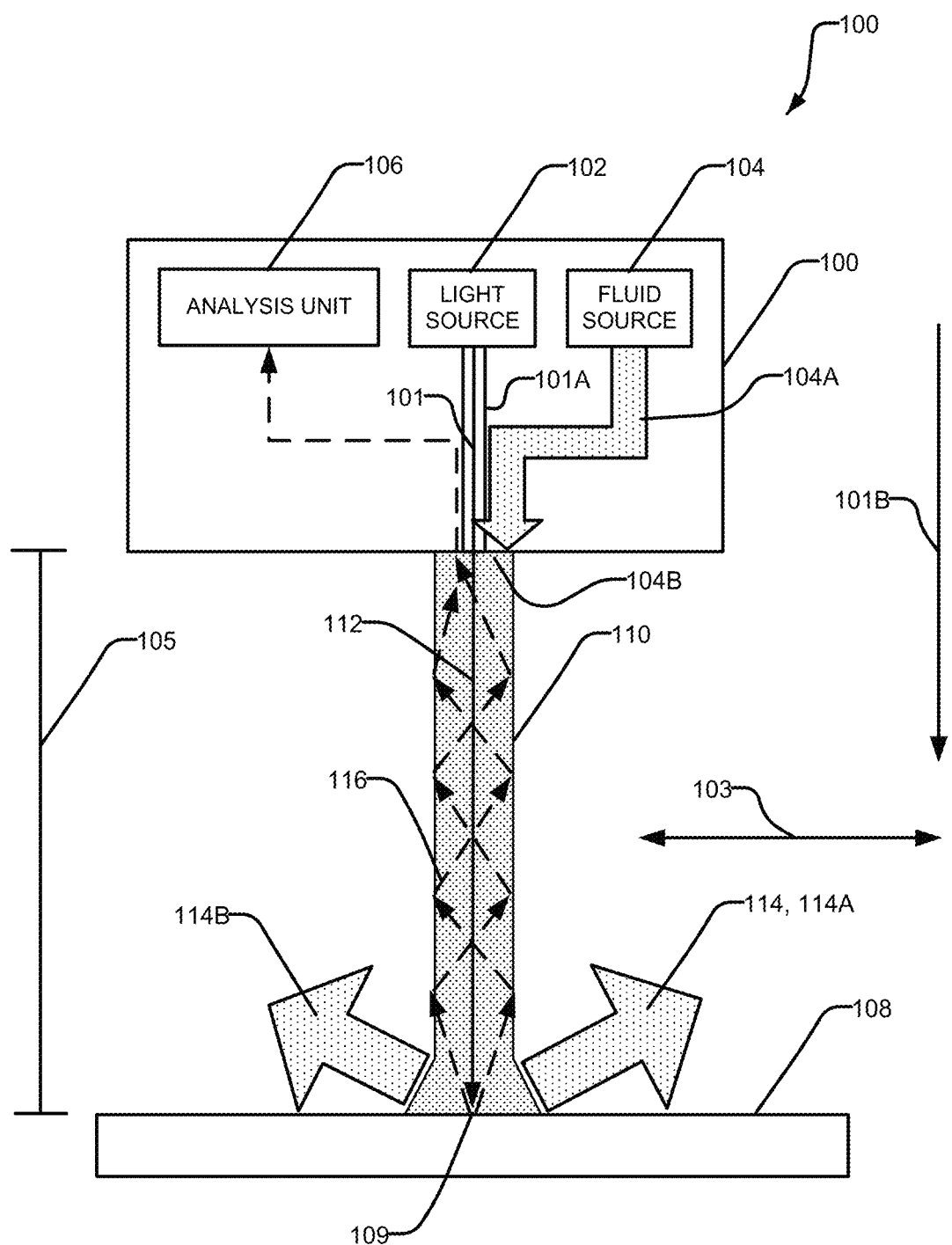
FIG. 1 is a schematic view of a spectrometer that includes a water jet that functions to collect light from tissue according to an example embodiment.

One aspect of the invention provides a water jet guided spectrometer useful for acquiring spectra of tissues in-vivo. FIG. 1 schematically illustrates a spectrometer system 100 according to an example embodiment. System 100 comprises a light source 102 such as a laser, a fluid source 104 and an analysis unit 106. System 100 may be applied to acquire spectra from any of a wide variety of sample types.

FIG. 1 shows system 100 being applied to obtain a spectrum of a tissue having tissue surface 108. Tissue surface 108 may extend in longitudinal directions 103 (shown by double-headed arrow in FIG. 1). System 100 is separated from tissue surface 108 by a distance 105. The space between system 100 and tissue surface 108 may, for example, be an air gap.

In operation, fluid source 104 supplies a fluid (e.g. water) through a passage 104A to a nozzle 104B which directs the water towards tissue surface 108. The directed water forms a water jet 110. In some embodiment fluid source 104 comprises a pump which draws water from a reservoir (not shown in FIG. 1).

Water jet 110 flows in direction 101B to tissue surface 108 where water jet 110 contacts tissue surface 108 at contact area 109. Water from water jet 110 leaves contact area 109 as stream 114. Stream 114 may disperse water as generally indicated by dotted arrows 114A and 114B.

Water jet 110 operates as a light guide at least between nozzle 104B and tissue surface 108. While water jet 110 is present a light source generates light which is guided to tissue surface 108 by water jet 110. In the example embodiment shown in FIG. 1 the light source 102 is provided by laser which emits laser light 112 along a path 101 toward tissue surface 108. Laser light 112 travels within water jet 110 for at least the part of water jet 110 that extends across gap 105 between nozzle 104B and tissue surface 108. Other parts of path 101 may be provided by any suitable media such as a light guide, optical fiber, channel etc. as schematically indicated by 101A.

Laser light 112 that reaches contact area 109 of tissue surface 108 interacts with the tissue. Various interactions are possible including elastic scattering, Raman scattering, fluorescence, etc. These interactions result in light that is outgoing from the location of the interaction. At least some of this light is directed back toward nozzle 104B from contact area 109. This light 116 (indicated by dashed arrows in FIG. 1) is collected by water jet 110 and travels back toward nozzle 104B guided by water jet 110.

Because the water in water jet 110 has a higher refractive index than air, light 116 is guided within water jet 110 by total internal reflection ("TIR"). Therefore, almost all of the collected light emitted into water jet 110 from tissue surface 108 is guided by water jet 110 back to system 100.

TIR is the optical phenomenon in which waves (e.g. light) arriving at an interface from a first medium (e.g. water) to a second medium (e.g. air) are not refracted into the second medium, but completely reflected back into the first medium. This phenomenon happens when the second medium has a lower refractive index than the first medium and the light is incident on the interface at an angle relative to the normal direction that is greater than a critical angle which depends on the indices of refraction of the first and second media. Water has a refractive index of about 1.33 whereas air has a refractive index of 1.0.

Collected light 116 that reaches system 100 is carried to an analysis unit 106. Analysis unit 106 may comprise a light sensor, spectrograph, interferometer, polarizer, or other optical analysis equipment operable to measure characteristics of collected light 116 such as intensity, spectrum, polarization, time of arrival, phase, etc. Measurements made by analysis unit 106 may yield insight into the characteristics of the tissue.

To achieve optimal light transmission, laminar flow conditions are maintained in water jet 110. Laminar flow is a flow regime in which particles of a fluid travel along smooth paths. Adjacent layers within the flowing fluid that have different velocities move smoothly past one another with little or no mixing.

Reynolds number is a dimensionless parameter that is predictive of the flow regime in a flowing fluid. Reynolds number (Re) is defined as $=DV\rho/\mu$, where V is the flow speed (m/s), D is a characteristic dimension (e.g. a diameter in which the flow occurs) (m), $\rho$ is fluid density (kg/m$^3$), and $\mu$ is viscosity of the fluid (kg/(m·s)). For flow in a pipe of diameter D, laminar flow occurs when Re<2300.

For the example case where water jet 110 has a diameter of about D=3 mm and p and p have the values predetermined by the physical properties of water, laminar flow in water jet 110 can be achieved by maintaining a flow rate that corresponds to a velocity of the water flowing in water jet 110 being in the range of about 0.1 to 0.15 m/s (which corresponds to 3.0 to 4.5 ml/s).

System 100 is capable of collecting light 116 significantly more efficiently than an otherwise similar system where collected light travels across an air gap. Water jet 110 can have a high numerical aperture (e.g. 0.88) due to the very high refractive index contrast between the core (water) and cladding (air) of water jet 110 and thereby can collect light that enters water jet 110 at contact area 109 from a wide range of angles. In addition, the absence of solid walls to contain water jet 110 between system 100 and tissue surface 108 and the smoothness of the water/air surface together reduce scattering. The high collection efficiency is particularly advantageous for types of spectrometry where a returning signal is weak (e.g. Raman spectroscopy or fluorescence spectrometry).

The general arrangement of system 100 may include an endoscope which may, for example be positioned to collect spectra from tissues of the lung, throat, colon etc. by way of a water jet. An endoscope used in system 100 is ideally configured so that light 112 is delivered into water jet 110 and is aligned with water jet 110. The endoscope also ideally includes efficient optics for carrying collected light to an analysis unit connected at the proximal end of the endoscope.

Some embodiments include a customized endoscope that includes a lumen for carrying water to a nozzle for creating water jet 110 as well as suitable optics for carrying light from light source 102 to water jet 110 and for carrying collected light to analysis unit 106. Some embodiments include a suitable commercially available endoscope. Nearly all existing commercially available endoscopes include a water channel intended for carrying water that can be directed to clean the surface of a tissue adjacent to a distal end of the endoscope. Some endoscopes also include an auxiliary water jet oriented to spray sideways to clean the end face of the endoscope. These water channels may be used to deliver water for a water jet 110. These and/or other channels of such commercially available endoscopes may be used to carry optical fibers to guide light along the endoscope to/from water jet 110.

Figure 2:
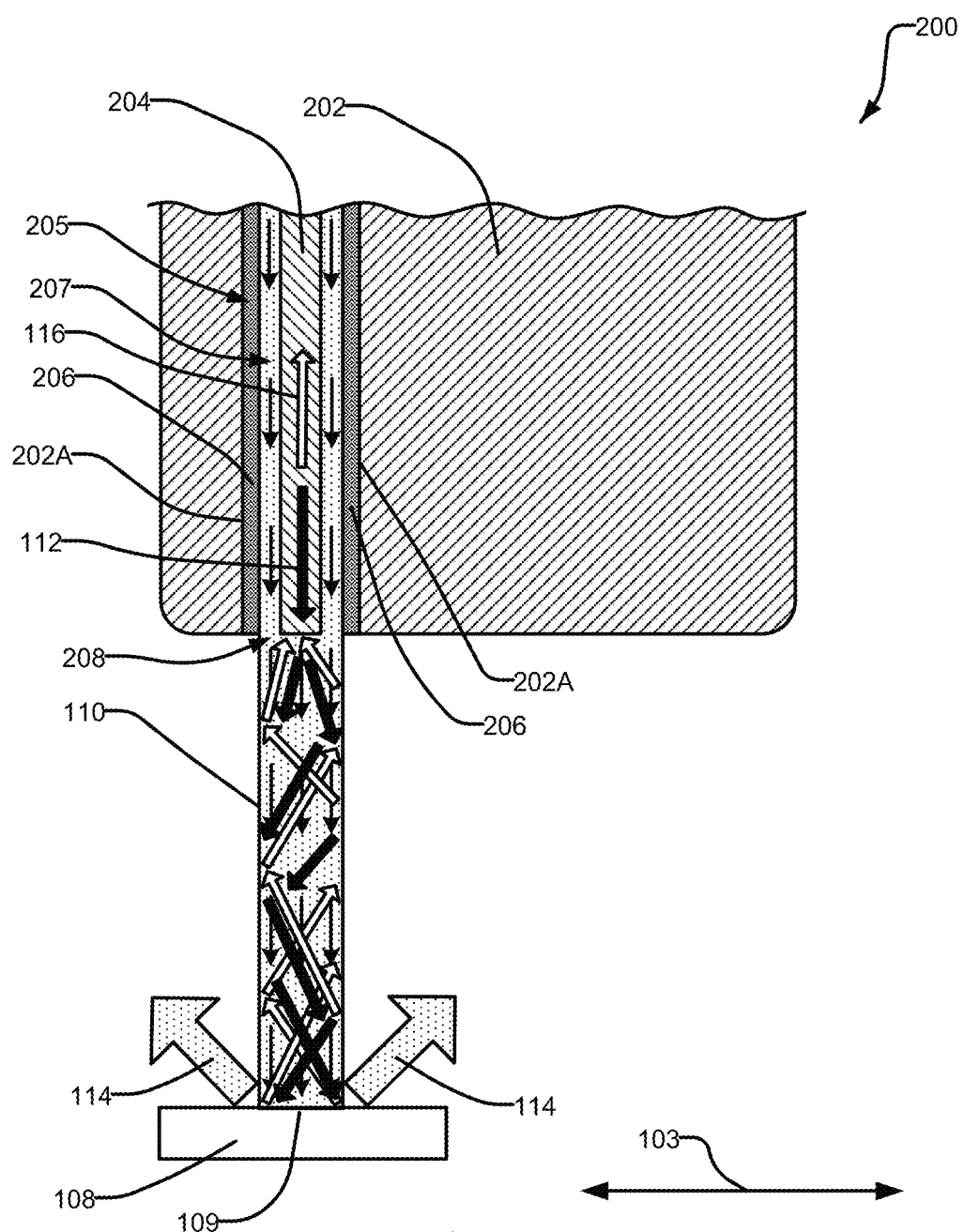
FIG. 2 schematically illustrates a distal portion of an endoscope configured to guide light to tissue and collect light from the tissue by way of a water jet.
Figure 3:
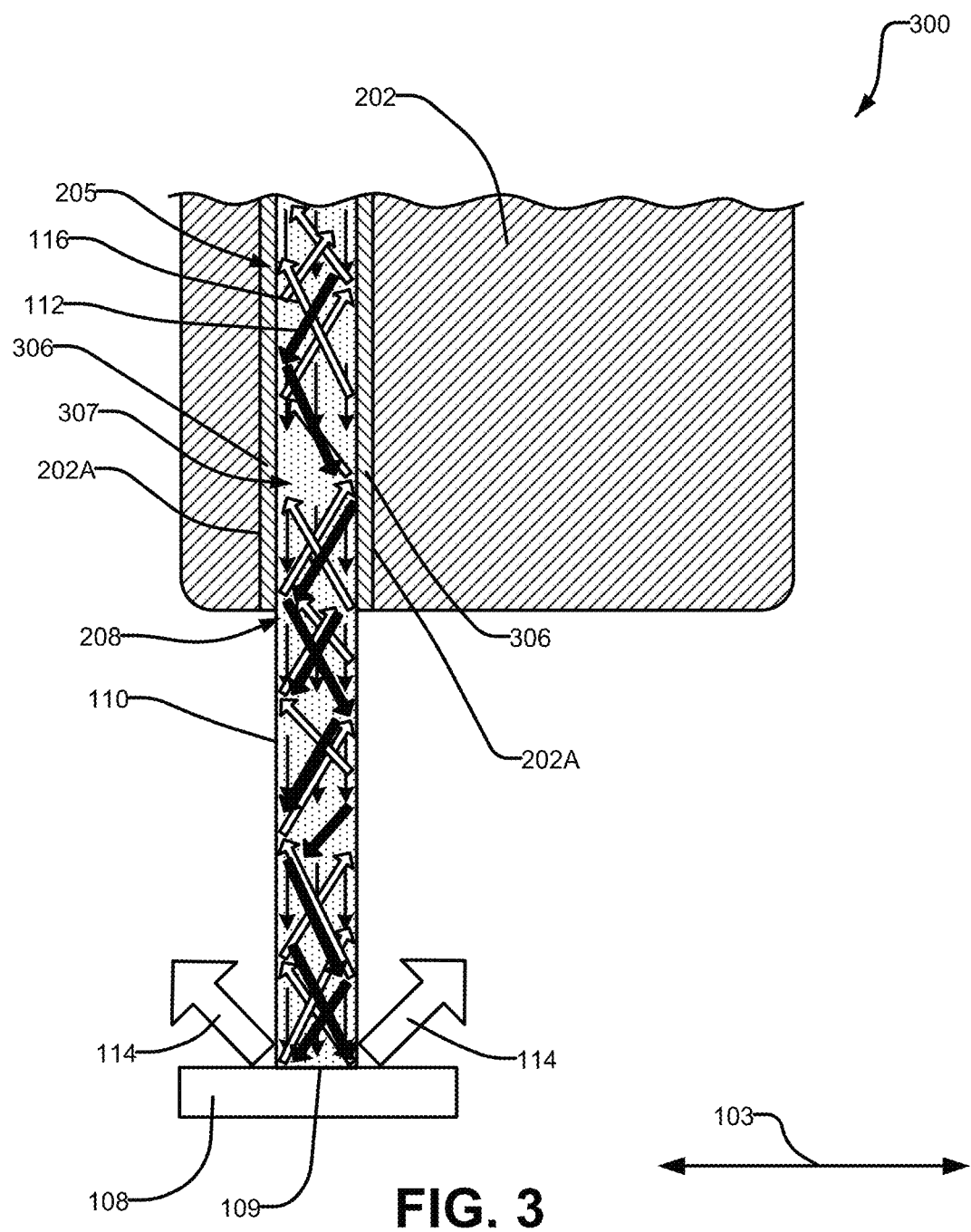
FIG. 3 schematically illustrates a distal portion of another example endoscope configured to guide light to tissue and collect light from the tissue by way of a water jet.

FIG. 2 and FIG. 3 schematically illustrate example endoscopes that may be used with a system 100. FIG. 2 schematically illustrates a distal end of an example endoscope 200 configured to align light 112 with water jet 110. Endoscope 200 comprises a longitudinally extending casing 202. At least one lumen extends along part or all of the length of endoscope 200.

Lumen 205 is defined by walls 202A, of casing 202. In the illustrated embodiment, lumen 205 is lined by a tube 206. Tube 206 has a bore 207 through which water may be carried. A wall of bore 207 may be smooth to encourage laminar flow. An inside diameter of tube 206 may match a desired diameter for water jet 110. Lumen 205 extends to an exit opening 208 at the distal end of endoscope 200.

In endoscope 200 a light guide 204 extends along bore 207. The light guide may, for example, comprise an optical fiber, a bundle of optical fibers, or the like. In some embodiments, light guide 204 comprises a tubular silica Raman probe. Light guide 204 extends to or almost to exit opening 208.

Light guide 204 is smaller in diameter than bore 207 such that water may be delivered along lumen 205 to exit opening 208 in the region surrounding light guide 204.

In operation light 112 (shown in dark solid arrows) travels through light guide 204 to the end of light guide 204. Upon exiting light guide 204 light 112 is guided by water jet 110 toward tissue surface 108. Resulting collected light 116 (shown in light solid arrows) is guided by water jet 110 toward exit opening 208 and is coupled into light guide 204 which carries the collected light to an analysis unit 106 (not shown in FIG. 2).

FIG. 3 schematically illustrates a distal end of another example endoscope 300 that may be used with in a system 100. Endoscope 300 is similar to endoscope 200 in some aspects. Certain features that can be the same in endoscopes 200 and 300 are labelled with the same reference identifiers in FIGS. 2 and 3.

Endoscope 300 differs from endoscope 200 in that collected light 116 is guided along endoscope 300 by a lumen filled with water that also provides water to water jet 110. In this embodiment a solid light guide extending along endoscope 300 is not required.

Endoscope 300 comprises a casing 202 that extends longitudinally and includes one or more lumens including lumen 205. The walls of lumen 205 are lined with a material that has an index of refraction that is significantly less than the index of refraction of water. For example, water has an index of refraction of 1.33 and the material may have an index of refraction of 1.295 or less or 1.19 or less or 1.28 or less. This facilitates guiding light by total internal reflection along lumen 205.

In example endoscope 300 a tube 306 extends along lumen 205. Tube 306 is made of a material that has an index of refraction that is significantly smaller than that of water.

For example, tube 306 may comprise Teflon™ AF 2400 tubing. In some embodiments tube 306 comprises polytetrafluoroethylene (PTFE).

The bore 307 of tube 306 is filled with water. The combination of the water in bore 307 and the surrounding material of tube 306 form a light guide that is operable to guide light 112 (shown in dark solid arrows) from the proximal end of endoscope 300 along endoscope 300 to water jet 110 and to guide collected light 116 (shown in light solid arrows) from water jet 110 along endoscope 300 to the proximal end of endoscope 300 where the collected light 116 may be routed to an analysis unit 106 (not shown in FIG. 3). Lumen 205 also serves to supply water to water jet 110.

Endoscope 300 and endoscope 200 each have relative advantages and disadvantages. In endoscope 200 light 112 and collected light 116 can be guided most or all of the way along the length of endoscope 200 by a light guide 204 which could be a high performance (low loss) light guide such as a silica Raman probe. Such a light guide 204 may be more efficient (less light loss) than the water-filled lumen of endoscope 300. On the other hand, in endoscope 300, essentially no light is lost in coupling collected light 116 from water jet 110 into water filled tube 306. These factors balance each other to some degree. A comparison of prototype endoscopes respectively having the construction of endoscope 300 and endoscope 200 demonstrated that the prototype endoscope 300 had an optical efficiency equivalent to that of the prototype endoscope 200 with a light guide 204 made up of 469 silica fibers with 100 μm diameter core and a NA of 0.22.

Another performance difference between endoscopes 300 and 200 relates to the coupling of collected light 116 out of the endoscope so that the light may be analyzed by an analysis unit 106. This is discussed below.

Figure 4A:
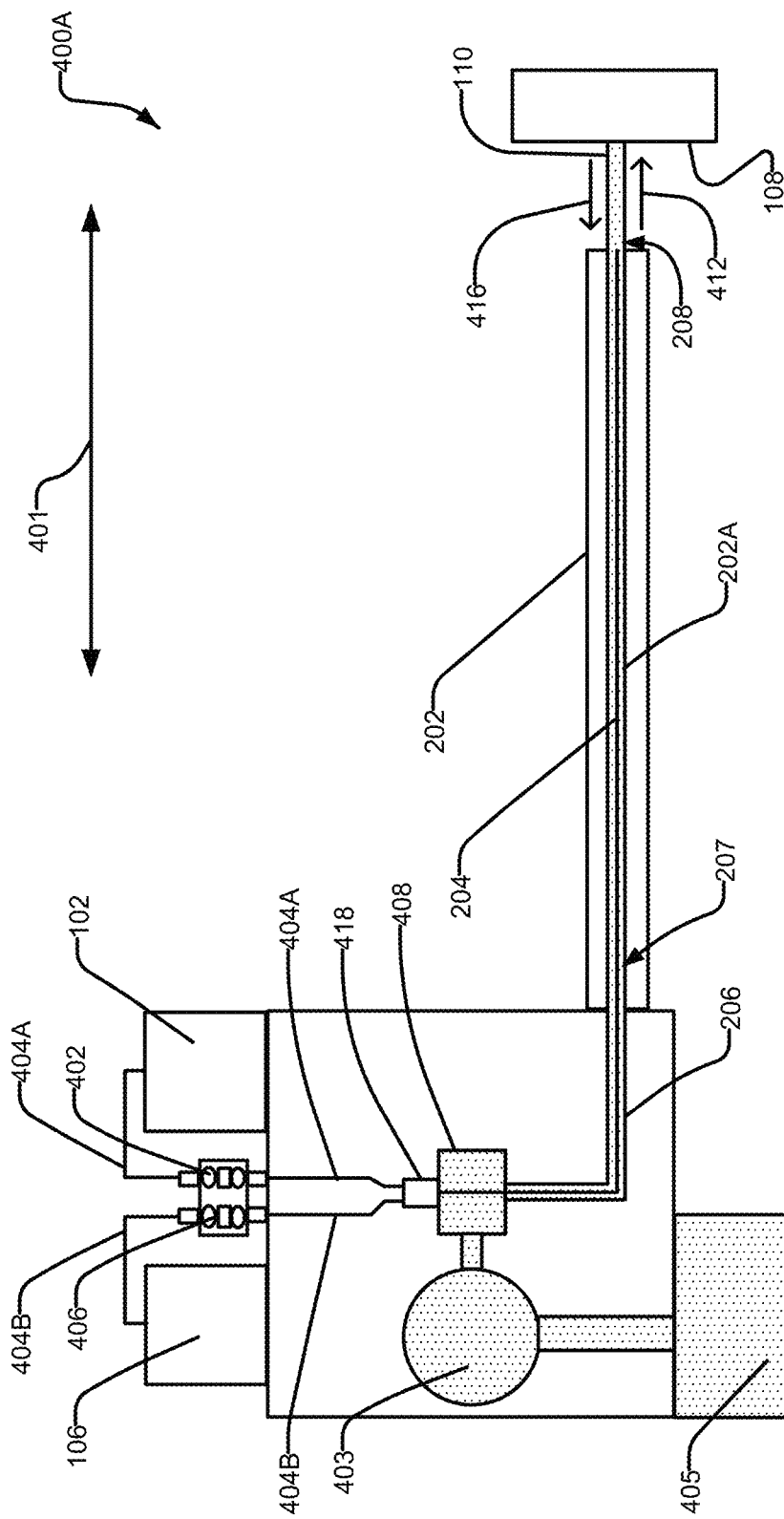
FIGS. 4A and 4B schematically illustrate example water jet guided spectroscopy systems that include endoscopes of the type illustrated in FIG. 2.
Figure 4B:
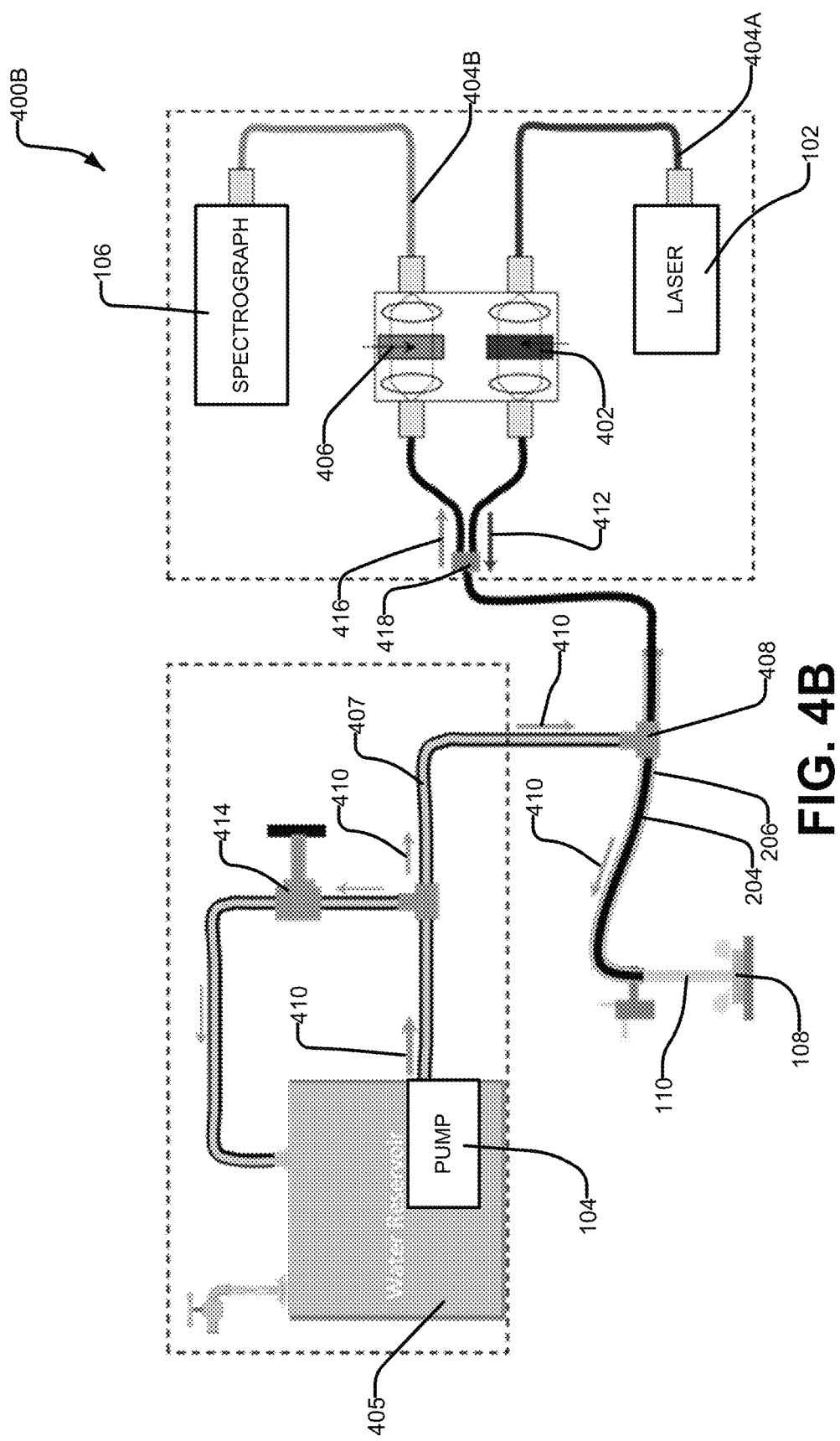

FIGS. 4A and 4B are schematic illustrations showing optical paths in example water jet guided spectroscopy systems 400A and 400B respectively. Systems 400A and 400B include endoscopes which include light guides like the light guide 204 of endoscope 200. These systems could also be configured to use endoscopes which use water filled tubes as light guides (like endoscope 300).

Spectroscopy system 400A comprises a reservoir 405 connected to provide water to pump 403. Pump 403 is connected to deliver a flow of water into bore 207 of tube 206 via a coupling 408.

Spectroscopy system 400A also comprises light source 102. Light emitted from light source 102 is delivered to a first set of optics 402 via fibers 404A. Optics 402 may, for example include optical elements such as lenses, filters, polarizers etc. Fibers 404A extend from light source 102 to optics 402 and then from optics filters 402 to an optical coupler 418 which couples light from light source 102 into a light guide 204 (e.g. a silica Raman probe). Optical coupler 418 may be a directional coupler which receives light from light source 102 at a first port and directs the light from light source 102 into light guide 204 and directs collected light from light guide 204 into a second port for delivery to an analysis unit 106 such as a spectrometer.

Spectroscopy system 400A further comprises analysis unit 106, such as a spectrograph, coupled to a second set of optics 406 via optical fibers 404B. Fibers 404B extend from analysis unit 106 to optics 406 and from optics 406 to optical coupler 418. Collected light coming from tissue 108 on light guide 204 is coupled into fibers 404B by optical coupler 418.

In operation light source 102 sends light 112 (not shown in FIG. 4A) through fibers 404A and optics 402 into light guide 204. The light 112 exits light guide 204 at or near exit opening 208. The light 112 is then guided by water jet 110 to tissue surface 108 as indicated by arrow 412.

Upon reaching tissue surface 108, light 112 penetrates and interacts with tissue. The interaction results in light that travels from the location of interaction, at least some of which enters water jet 110 as collected light 116. The collected light 116 (not shown in FIG. 4A) is guided by water jet 110 back to light guide 204 as indicated by arrow 416. The collected light 116 is then guided by light guide 204 to optical coupler 418 where it is coupled into fibers 404B which carry the collected light 116 to analysis unit 106 by way of optics 406.

FIG. 4B schematically illustrates another example water jet guided spectroscopy system 400B. Features of spectroscopy system 400B labelled with the same references used to identify corresponding features of spectroscopy system 400A may be the same as or similar to the corresponding features of spectroscopy system 400A.

Spectroscopy system 400B comprises a pressure regulator 414 which controls a flow rate of water jet 110. Pressure regulator 414 may be adjusted to achieve and maintain laminar flow 410 of water in water jet 110.

Figure 5A:
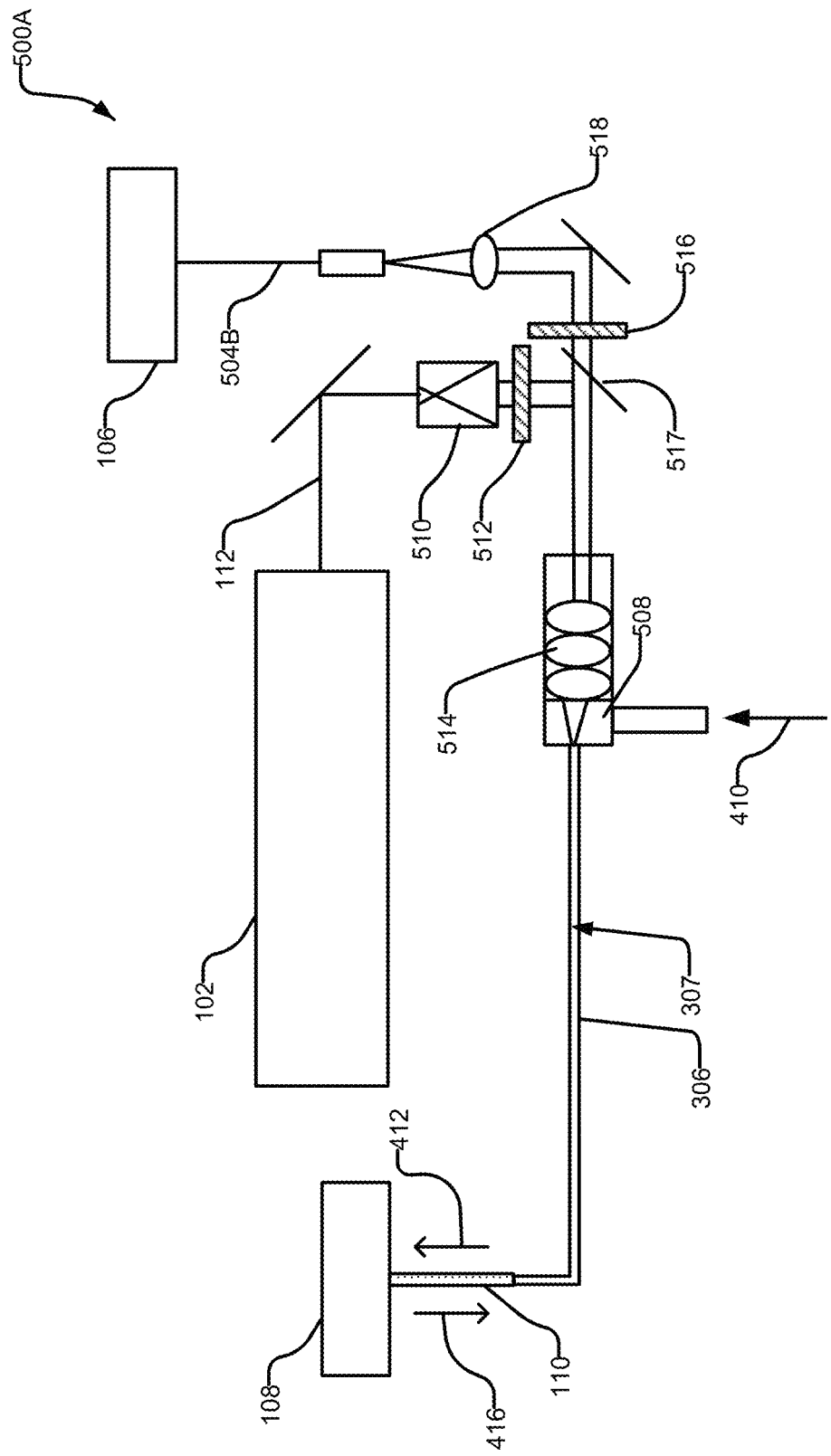
FIG. 5A schematically illustrates an example water jet guided spectroscopy system that includes an endoscope of the type illustrated in FIG. 3.

FIG. 5A schematically illustrates another example water jet guided spectroscopy system 500A. Spectroscopy system 500A incorporates an endoscope that is like endoscope 300 and comprises a water filled tube 306 which serves as a light guide and also serves to deliver water for water jet 110. Water 410 from a water source (not shown in FIG. 5A) is delivered into bore 307 of tube 306 via a coupling unit 508.

Light 112 from light source 102 is directed to a beam expander 510. The expanded light beam passes through a laser line filter 512. Light 112 is then coupled into the water-filled bore 307 of tube 306 by optics 514.

Light 112 is guided along water-filled bore 307 into water jet 110 which guides the light 112 to tissue surface 108 as indicated by arrow 412. Collected light 116 which results from interaction of light 112 with tissue is guided by water jet 110 and water-filled bore 207 to optics 514 which couples the collected light out of water-filled bore 307 as indicated by arrow 416. The collected light 116 is separated from laser light 112 at element 517 and passed through a filter 516 before being directed through a fiber coupler lens 518 and delivered to an analysis unit 106 via fibers 504B.

In the case of Raman spectroscopy, element 517 may be a wavelength selective mirror (e.g. a dichroic mirror), filter 516 may be a long pass filter and analysis unit 106 may comprise a spectrograph which outputs a Raman spectrum.

Figure 5B:
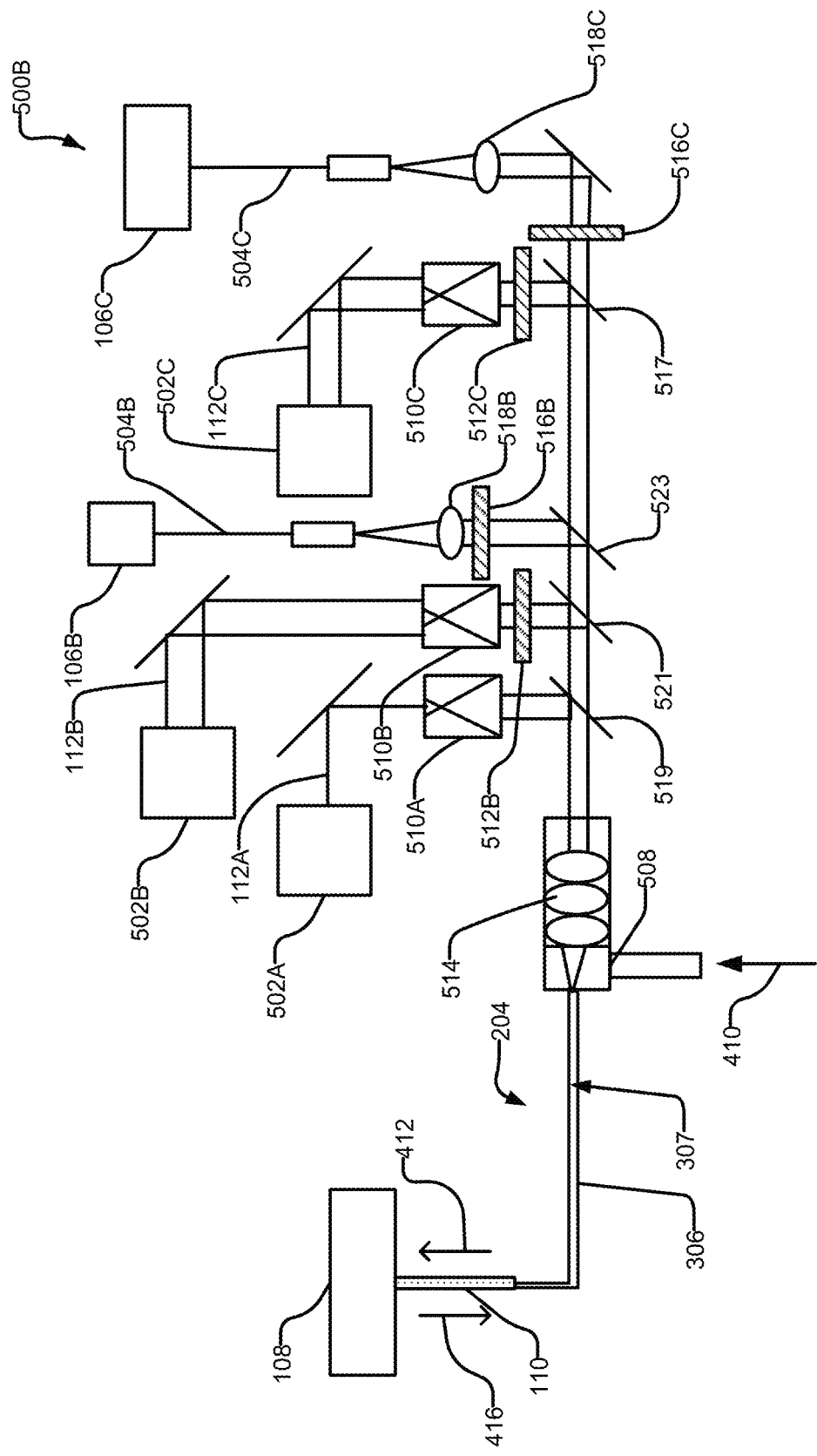
FIG. 5B schematically illustrates an example multi-modality water jet guided spectroscopy system.

The technology described herein is not limited to a single type of spectroscopy. A water jet as described herein may provide a light path for two or more spectroscopy modalities. FIG. 5B schematically illustrates an example multimodality water jet guided spectroscopy system 500B. System 500B includes a light guide 204 that provides light paths operable for delivering light to a tissue or sample and for returning collected light from the sample for detection and analysis. In some embodiments, light guide 204 passes through and/or or is integrated with an endoscope In the illustrated system 500B light guide 204 passes through an endoscope that is like endoscope 300 of FIG. 3 and comprises a water filled tube 306 which serves as a light guide and also serves to deliver water for water jet 110. System 500 could include an alternative arrangement for guiding light such as a light guide 204 as provided by endoscope 200 of FIG. 2, for example. Water 410 from a water source (not shown in FIG. 5A) is delivered into bore 307 of tube 306 via a coupling unit 508.

System 500B comprises a plurality of light sources (light sources 502A, 502B and 502C which respectively emit light 112A, 112B and 112C—generally and collectively light 112—are shown) and a plurality of analysis units (analysis units 106A and 106B are shown). These light sources and analysis units are collectively operable to perform several modes of spectroscopy. For example, system 500B may be selectively operable to perform white light reflectance spectroscopy, fluorescence spectroscopy and Raman spectroscopy. In each mode of spectroscopy light from a light source is delivered to a sample by way of water jet 110 (as indicated by arrow 412) and corresponding collected light 116 collected by water jet 116 and returned for analysis by a corresponding analysis unit. Some light sources and/or some analysis units may be common to two different modalities. System 500B includes suitable optics for directing light 112 from each of the light sources into an optical path that includes light guide 204 and water jet 110 and for directing collected light 116 to an appropriate analysis unit. For example, the optics may include suitable filters and wavelength selective elements such as dichroic mirrors to route illuminating light 112 and collected light 116 appropriately.

First light source 502A is operable to emit light 112A. Light 112A is directed to a beam expander 510A. The expanded light beam 112A is directed toward optics 514 by element 519. Expanded light beam 112A is then coupled into light guide 204 by optics 514.

First light source 502A may, for example comprise a white light source operable to emit white light suitable for reflectance spectroscopy. Element 519 may be a 50/50 beam splitter. In some embodiments, light 112A is filtered to remove near infrared wavelengths.

Light 112A passes through water jet 110 into a sample. Some of light 112A is reflected back into and is collected by water jet 110 as indicated by arrow 416. This collected light is then routed to analysis unit 106B. Analysis unit 106B may for example measure an overall intensity of the collected reflected light and/or an intensity of the collected reflective light as a function of wavelength.

System 500B comprises a second light source 502B operable to emit light 112B. Light 112B is directed to a beam expander 510B. The expanded light beam 112B passes through a laser line filter 512B. Light 112B is then directed by element 521 to be coupled into light guide 204 by optics 514. Light 112B is guided along light guide 204 into water jet 110 which guides the light 112B to tissue surface 108 as indicated by arrow 412.

Collected light 116 which results from interaction of light 112B with tissue is guided by water jet 110 and light guide 204 to optics 514 which couples the collected light out of light guide 204. The collected light 116 passes through beam combining element 521. The collected light 116 is then directed by element 523 toward a filter 516B before being directed to analysis unit 106B. In the illustrated embodiment the collected light is delivered to analysis unit 106B through a fiber coupler lens 518B and fibers 504B. Element 523 may comprise a wavelength selective element that passes shorter (e.g. visible wavelengths) to analysis unit 106B and passes longer (e.g. near infrared and/or infrared light to element 517.

Second light source 502B may emit light 112B at a wavelength that is selected to excite fluorescence in tissue. For example, light source 502B may be a blue laser that emits blue light (e.g. light having a wavelength of 405 nm).

In the case of fluorescence spectroscopy, element 521 may be a wavelength selective mirror (e.g. a dichroic mirror), filter 516B may be a long pass filter and analysis unit 106B may comprise a spectrograph which outputs a fluorescence spectrum. Element 521 may, for example, reflect light 112B and transmit light having longer wavelengths.

System 500B comprises a third light source 502C operable to emit light 112C. The expanded light beam 112C is directed towards optics 514 by element 517. Expanded light beam 112C is then coupled into light guide 204 by optics 514. Light 112C is guided by light guide 204 into water jet 110 which guides the light 112C to tissue surface 108 as indicated by arrow 412. Collected light 116 which results from interaction of light 112C with tissue is collected by water jet 110 as indicated by arrow 416 and guided by water jet 110 and light guide 204 to optics 514 which couples the collected light out of light guide 204. The collected light 116 passes through elements 519, 521 and 523 before being directed to analysis unit 106C by element 517. In the illustrated embodiment collected light is delivered to analysis unit 106C by way of a filter 516C, a fiber coupler lens 518C and fibers 504C.

Light source 502C may be a laser with wavelength suitable for Raman spectroscopy. For example, light source 502C may be a laser which emits light 112C having a wavelength of 785 nm. Element 517 may direct collected Raman shifted light to analysis unit 106C. Filter 516C may be a long pass filter which blocks light 112C and analysis unit 106C may comprise a spectrograph which outputs a Raman spectrum.

In operation, multi-modality spectroscopy system 500B may be switched among different modes and/or operated to provide simultaneous operation in two or more spectroscopy modes. For example, first light source 502A (e.g. white light) and third light source 502C (e.g. Raman laser) may emit respective light 112A and 112C simultaneously. Collected light in different wavelength bands may be simultaneously analyzed by analysis units 106B and 106C. The multi-modal operation of spectroscopy system 500B may enhance collection efficiency while accommodating more than one objectives (e.g. providing information to support diagnoses of cancer and/or other pathologies simultaneously).

FIG. 6A schematically illustrates a conventional nozzle configuration of conventional endoscopes. FIGS. 6B and 6C schematically illustrate example embodiments of nozzles for endoscopes 200 and 300.

FIG. 6A shows schematically a typical arrangement for the distal end of a conventional endoscope which includes a plurality of lumens configured for certain functions. Lumen 602 is an instrument channel. Lumen 604 is intended for insertion of illumination fiber bundles. Lumen 606 is intended for use as a water spray nozzle. Lumen 606A is intended for use as an auxiliary water nozzle. Lumen 608 is intended to accommodate a camera.

FIGS. 6B and 6C respectively show distal ends of endoscopes 600B and 6000 which include lumens that serve to carry optical signals (light 112 and collected light 116) and also to supply water to provide a water jet 110 that spans a gap between the distal end of the endoscope and a tissue surface. Features that can be the same or similar to features of endoscope 600A are identified using the same reference identifiers in FIGS. 6B and 6C.

Endoscope 600B of FIG. 6B includes a light guide 204 that extends through lumen 606. Light guide 204 has a diameter smaller than that of lumen 606. Water can flow along lumen 606 in an annular region surrounding light guide 204. A tube 206 having a bore 207 is optionally provided in lumen 606 in which case water flows in a portion of bore 207 surrounding light guide 204. Endoscope 600B may comprise a conventional endoscope having a light guide 204 (or tube 206 and light guide 204) inserted through water spray lumen 606 (with a suitable arrangement to get light guide 204 into lumen 606 without water leakage at the proximal end of the endoscope).

Endoscope 6000 of FIG. 6C comprises a low index of refraction tube 306 configured to support guidance of light 112 and collected light 116 through a water-filled bore 307 of tube 306. Tube 306 may, for example, be a Teflon™ tube. Endoscope 6000 may comprise a conventional endoscope having a tube 306 inserted into water spray lumen 606 (with a suitable arrangement to get light 112 into lumen 606 and collected light 116 out of lumen 606 without water leakage at the proximal end of the endoscope).

To verify the efficiency of system 100, Raman spectroscopy was performed on an acetaminophen sample and also on in vivo human skin. The spectrometry system was configured as shown in FIG. 4B. The results of these experiments show greatly improved RS sensitivity and stability as compared to Raman spectroscopy performed without a water jet 110.

For the experiment, a 785 nm laser was used as a light source and light guide 204 was a silica Raman probe selected to have a 1.3 mm diameter carrying a multimode fiber. Laser light 112 was delivered into optics 402 which included a near-infrared lens for collimating laser light 112 and a narrow band-pass filter for removing fiber fluorescence and laser noise. The collimated laser light 112 was focused into a light guide 204 provided by a multiple-fiber probe in which separate fibers were used for illumination laser delivery and carrying Raman scattered collected light 116.

Collected light 116 carried by light guide 204 was delivered to optics 406 which included a long-pass filter to block laser light 112 while allowing collected Raman scattered light 116 to reach analysis unit 106.

During collection of the Raman scattered light, water was pumped from reservoir 405 through a water tube which also served as protective sheath for light guide 204. The outside diameter of the water tube was about 3 mm, which is similar to the size of an instrument channel in a typical endoscope. A meter-long water tube was used to simulate the length of the water channel in endoscopy. Water jet 110 was produced at exit opening 208. Constant water flow speed was adjusted by pressure regulator 414 to achieve a water jet velocity ranging from 0.1 to 0.15 m/s (or 3.0 to 4.5 ml/s). The distal end of light guide 204 was vertically oriented and mounted on an automatic micrometer stage to adjust the probe-sample distance.

Figure 7:
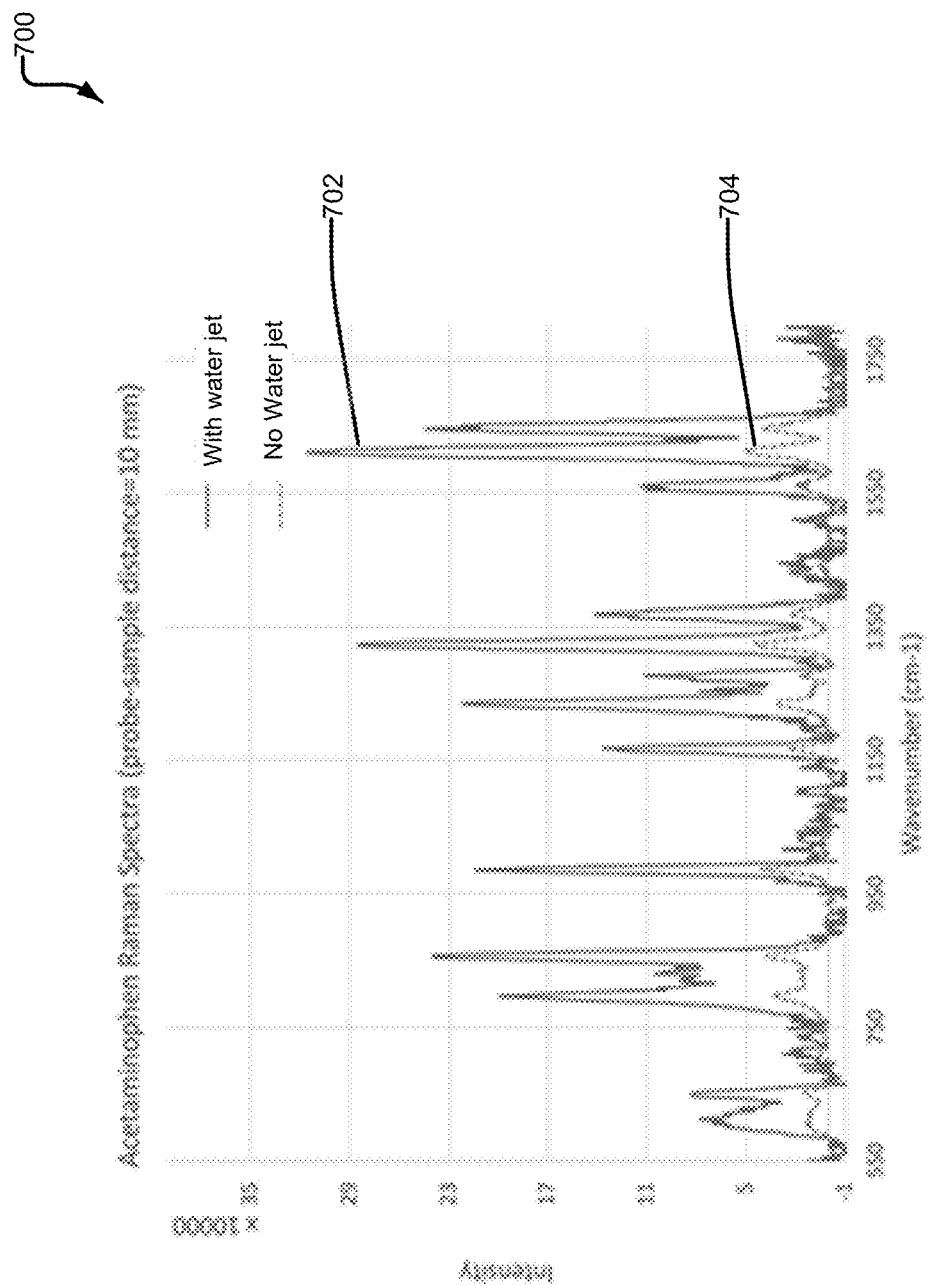
FIG. 7 is a plot comparing Raman spectra of acetaminophen measured with and without use of a water jet to guide Raman shifted light to a spectrometer.

FIG. 7 is a plot 700 comparing Raman spectra of acetaminophen measured with and without a water jet 110. Solid line 702 represents the intensity of a Raman spectrum of acetaminophen as a function of Raman shift (wavenumber) measured with water jet 110 present over a range of wavenumbers. Dotted line 704 represents the intensity of a Raman spectrum of acetaminophen as a function of Raman shift (wavenumber) measured without water jet 110 present over the same range of wavenumbers. The probe-sample distance for the setup of plot 700 was 10 mm.

As can be seen from plot 700, the Raman spectrum of solid line 702 is much more intense than the Raman spectrum of dotted line 704 for all of the various peaks seen in the plot. At a probe-sample distance of 10 mm, the presence of water jet 110 enhances the Raman signal collection efficiency by about 6 times.

Figures 8A, 8B:
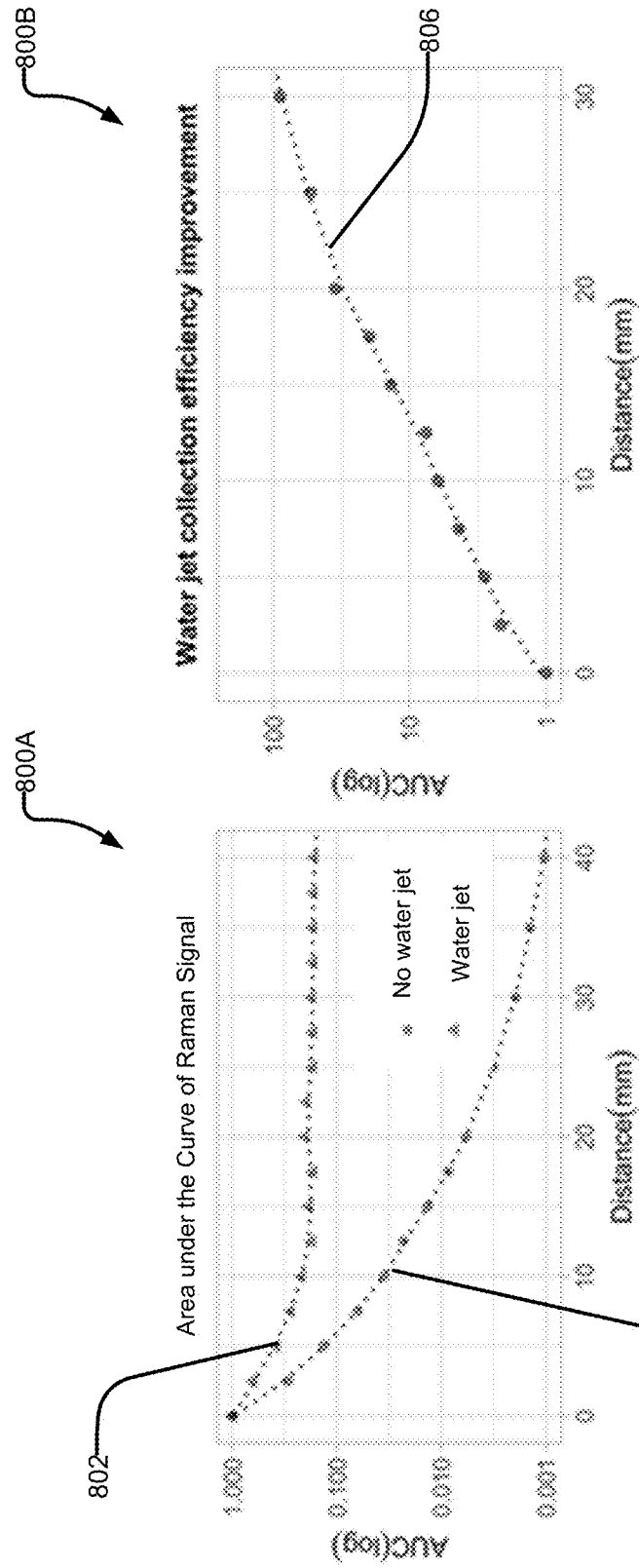
FIG. 8A is a graph showing the normalized area under a Raman signal curve as a function of distance of a probe from a sample vertically oriented to a water jet and without use of a water jet to guide Raman shifted light to a spectrometer.
FIG. 8B is a plot that illustrates efficiency improvement achieved by using a water jet to deliver and collect light from a sample from a vertical position relative to a non-water jet system as a function of distance between a probe and a sample.

FIG. 8A is a plot 800A showing the normalized area under a Raman spectrum curve for acetaminophen (for which the Raman spectrum is shown in FIG. 7) as a function of probe-sample distance with water jet 110 (curve 802) and without a water jet (curve 804). FIG. 8B is a plot 800B showing the light collection efficiency improvement provided by the presence of water jet 110 in comparison to the same system without water jet 110.

As probe-sample distance increases from 0 mm to 40 mm, the efficiency improvement (i.e. the gap between curves 802 and 804) increases, demonstrating the superior capability of a water jet guided system to maintain high reliability even at high probe-sample distances.

Curve 806 of plot 800B is generated by dividing values of curve 802 by values of curve 804 at each sample-probe distance. As shown by curve 806, when both systems are at a probe-sample distance of 0 mm, their efficiency is comparable. As probe-sample distance increases, the presence of water jet 110 provides a higher and higher efficiency gain in comparison to that of the same system with no water jet 110. The efficiency improvement reached about 100 times at a probe-source distance of 30 mm.

To further validate the efficiency gains provided by a water jet 110 Raman spectrum measurements were conducted on human tissue in vivo with and without a water jet 110. The measurements were taken of the dorsum of the hand of a volunteer at a probe-tissue distance at 10 mm. To compare the collection efficiency, Raman spectra was also taken without water jet.

Figures 9A, 9B:
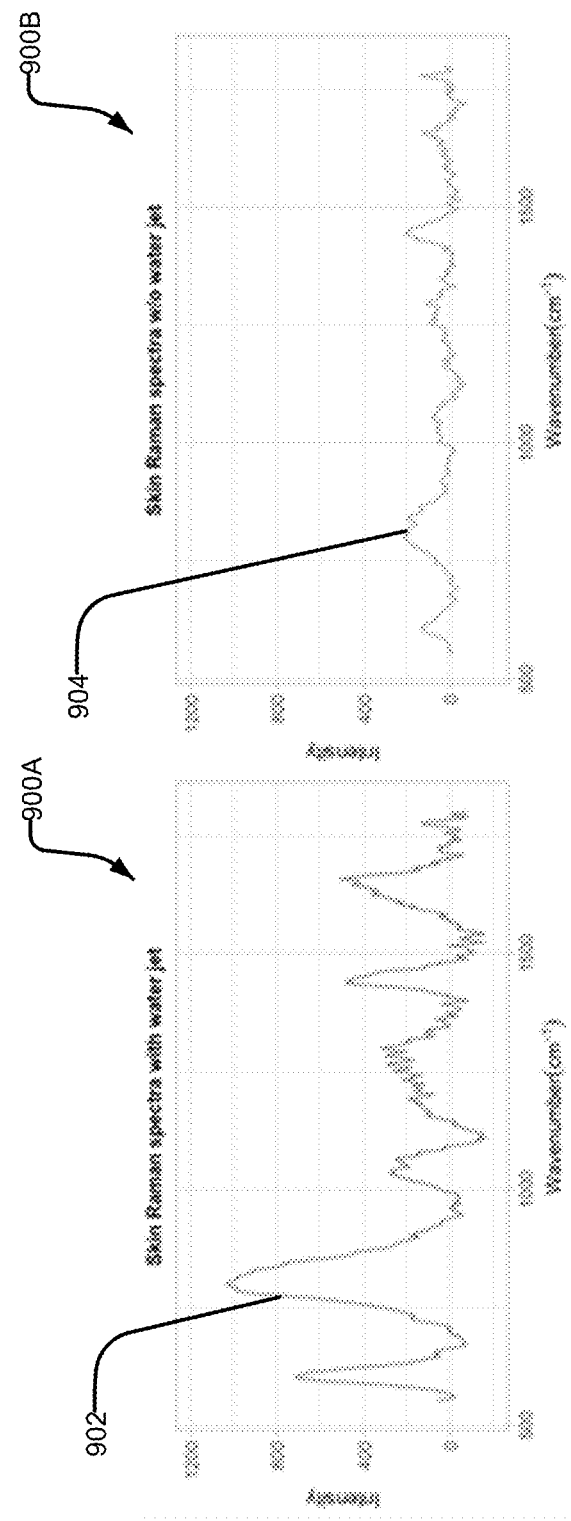
FIG. 9A is a plot of an intensity curve of in vivo Raman signals measured with a water jet.
FIG. 9B is a plot of an intensity curve of in vivo Raman signals measured without a water jet.

FIGS. 9A and 9B are respectively plots 900A and 900B which respectively show a Raman spectrum acquired with a water jet 110 and a Raman spectrum acquired without a water jet 110. The x- and y-axis scales of plots 900A and 900B are identical.

As can be seen from curves 902 and 904, the intensity of Raman signals measured with water jet 110 present is much higher than the intensity of Raman signals measured without water jet 110 at the various peaks. These results further verify the improved efficacy of a system that provides a water jet 110 for collecting Raman scattered light from tissue.

A water jet 110 need not be oriented vertically. Other orientations are also possible. Most conventional endoscopes have an angular bend at the opening of the accessory working channel which may affect the outlet angle of a water jet 110. Also, the orientation of a patient and an endoscope may not permit water jet 110 to be oriented vertically.

To evaluate how signal collection efficiency varies with probe orientation, a Tylenol tablet (acetaminophen) was also measured for a horizontal water jet outlet angle. Acetaminophen was placed besides the Raman probe with the water jet outlet oriented horizontally. The probe-sample distance was adjusted by a micrometer sampling stage in the range of from 0-40 mm. The acquired spectra were multiplied by different scale factors to maintain the same excitation power and exposure time for analysis.

Experiments have been conducted to test the effect of orientation on a water jet 110. While a vertical orientation is ideal, a horizontal orientation is workable. A water jet 110 oriented in a direction that has a horizontal component has a parabolic trajectory, which might affect the signal collection efficiency at longer probe to sample distances due to the change of incident angle and light transmission loss. This scenario was tested and it was observed that this issue is not a concern at probe to sample distances that are not too long (e.g. very little effect on collection efficiency for Raman scattered light was observed for probe-to-sample distances at least up to 15 mm).

Figures 10A, 10B:
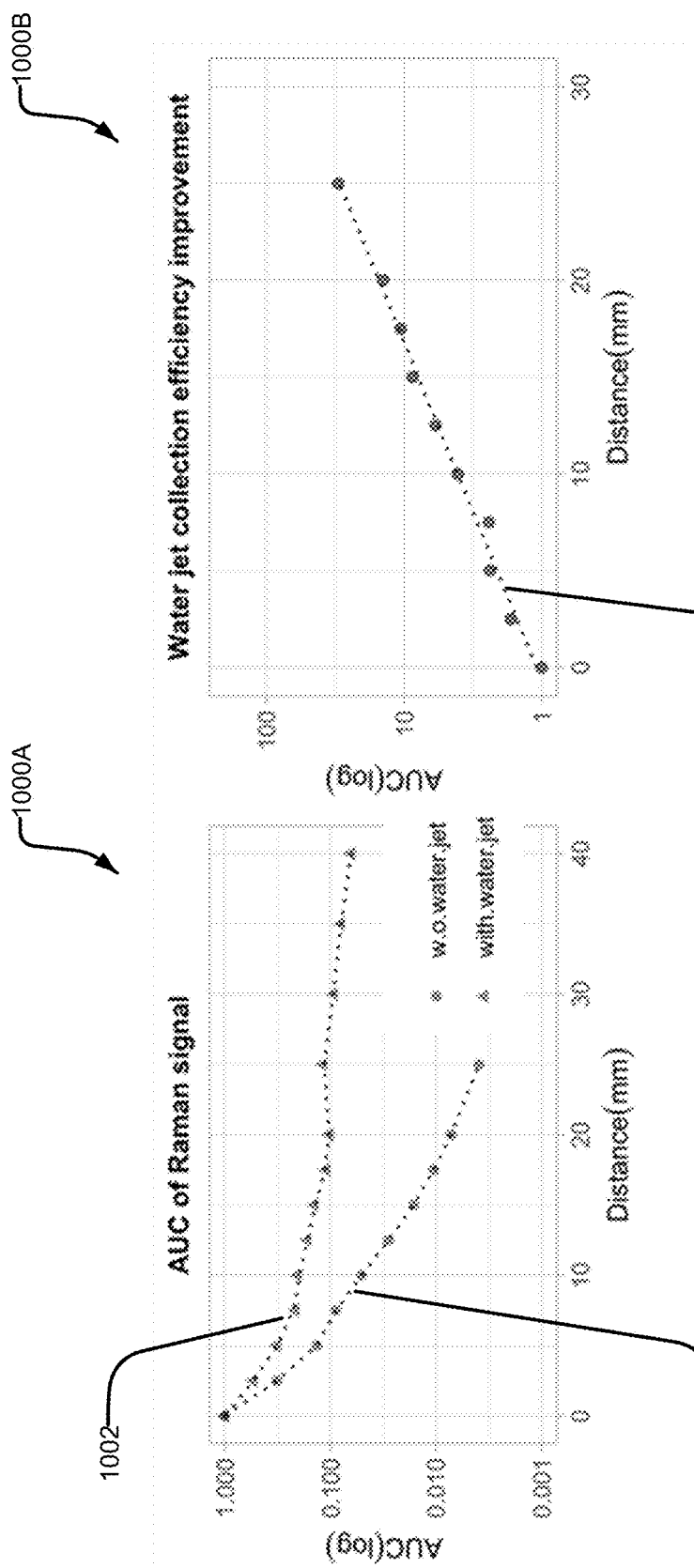
FIG. 10A is a graph showing the normalized area under a Raman Signal curve as a function of distance between a probe and a sample from a sample horizontally oriented to a water jet and without use of a water jet to guide Raman shifted light to a spectrometer.
FIG. 10B is a plot that illustrates efficiency improvement achieved by using a water jet to deliver and collect light from a sample from a horizontal position relative to a non-water jet system as a function of distance between a probe and a sample.

FIG. 10A is a plot 1000A showing the normalized area under a Raman spectrum curve for acetaminophen placed horizontally to the probe as a function of probe-sample distance with water jet 110 (curve 1002) and without a water jet (curve 1004). FIG. 10B is a plot 1000B showing the light collection efficiency improvement provided by the presence of water jet 110 in comparison to the same system without water jet 110 for acetaminophen placed horizontally to the probe as a function of probe-sample distance.

As probe-sample distance increases from 0 mm to 40 mm, the efficiency improvement (i.e. the widening gap between curves 1002 and 1004) increases, demonstrating the superior capability of a water jet guided system to maintain high reliability even at high probe-sample distances. Curve 1006 of plot 1000B is generated by dividing values of curve 1002 by values of curve 1004 at each sample-probe distance.

Collection efficiency for a horizontal water jet varies with probe-to-source distance in a similar way to a vertical water jet. For distances in the range of 0-10 mm, at which range the parabolic trajectory shape is less obvious there is very little difference between the light collection efficiency of horizontal and vertical water jets. At d=10 mm, the horizontal water jet provides a collected Raman signal that is about 5 times more intense than the same signal collected in the absence of a water jet 110. For distances longer than 10 mm, the collection efficiency with a water jet remains significantly greater than without a water jet but the difference in efficiency falls off somewhat faster with distance than observed for a vertical water jet.

A water jet 110 oriented vertically upward may require a somewhat higher flow velocity to maintain stable laminar flow than a water jet 110 oriented vertically downward. In some embodiments of the present technology an orientation sensor (e.g. inclinometer or accelerometer) is provided to monitor an orientation of a water jet 110 and a fluid controller is configured to adjust a pressure and/or flow rate of the water supplied to maintain water jet 110 in response to the orientation determined by the orientation sensor.

The results shown in FIGS. 7, 8A-B, 9A-B and 10A-B demonstrate that a system that includes a water jet to carry collected light 116 can acquire Raman spectra with high sensitivity and stability with minimal risk to damaging the tissue.

One significant advantage of the disclosed approach over prior methods is that the illumination and collection volumes are substantially fixed regardless of the working distance (i.e. probe-tissue distance). This can result in less spectral variability and better diagnoses. With some alternative approaches for enhancing collection efficiency, such as using a parabolic concentrator (CPC) to capture light from tissue or providing a spacer to maintain a desired working distance the collection volume can be different depending on the amount of pressure applied to the tissue surface by the CPC or spacer.

Another advantage of the disclosed water jet guided system is that it can simplify endoscopy measurement and can also be used in cases where an endoscope is not required. Many existing spectroscopy systems (including Raman spectroscopy systems) may be readily modified to include a water jet 110.

A spectrometry system as described herein which uses a water jet 110 to collect light may be used over a wide range of working distances (e.g. up to 40 mm or more) for Raman spectroscopy and/or other spectroscopy modes. The wide permissible range of distance is very advantageous in clinical in vivo measurement for accommodating use case variability and imperfect centering during endoscopy.

Moreover, the disclosed configurations of endoscope 200 and endoscope 300 automatically align water jet 110 with illumination light 112 and automatically collect collected light 116 from the illuminated part of the target sample. No additional effort is required on the user to achieve precise alignment.

FIGS. 11A-D are cross section views of tubes that include features for supporting a light guide inside the tubes while providing space for water flow around the light guide. Light guide 204 is centralized within the tubes in some embodiments. Tubs 1100A-D align light guide 104 with a water jet made up of water carried by the tubes.

Tube 1100A comprises a central tube 1101 supported in the bore of an outer tube 1102 by webs 1103. Any sensible number of webs 1103 may be provided. Tube 1100A may be formed for example by extrusion. Water carrying passages 1104A are defined in the annulus between inner tube 1101 and outer tube 1102. A light guide comprising one or more optical fibers may be provided in the bore of inner tube 1101. In the illustrated embodiment light guide 204 includes an excitation fiber 1108 which may, for example be connected to carry light from a laser or other light source to a sample and plural optical fibers 1106 which may, for example, carry collected light 116 for analysis.

Tube 11001B carries a light guide 204 similar to that of tube 1100A and differs from tube 1100A in that the water carrying passages 1104B are round in cross section.

Tube 1100C is similar to tube 1100A except that excitation fiber 1108 is separated from optical fibers 1106. This may allow better separation of collected light 116 from excitation light 112.

Tube 1100D comprises a low refractive index outer tube 1110 (e.g. made of Teflon™). Excitation fiber 1108 is supported inside (preferably at the center) of outer tube 1110 by centralizing arms 1112. Arms 1112 are preferably made of a material that does not emit light in a spectrum of interest for collected light 116 in response to excitation light carried by excitation fiber 1108 or collected light 116. For example, when tube 1100D is used for Raman spectroscopy arms 1112 may be made of a material that is substantially not Raman emitting. In the illustrated embodiment arms 1112 have the form of a cross hair. The cross sectional area around excitation fiber 1108 is available to both carry water to a water jet 1110 and to act as a light guide for collected light 116.

Tubes 1100A to 1100D are merely examples. Many other designs that accommodate water passages and one or more light guides are possible, including designs that combine features of different ones of tubes 1100A to 1100D. Tubes 1100A to 1100D may be deployed to carry water and light through a passage in an endoscope or in other applications.

One example application of the present technology is spectroscopy performed in conjunction with biopsy. In conventional Raman colonoscopy a Raman probe is inserted through the biopsy channel of an endoscope. Raman spectra acquired by the Raman probe may be studied to select biopsy locations. Each time it is desired to take a biopsy the Raman probe must be removed before the biopsy can be taken and then replaced after the biopsy is taken. This can add significant time to a colonoscopy procedure. Even with a protocol that involves collecting spectra of all suspicious sites first and then going back to biopsy on selected sites, there is still a significant amount extra time required while there is a chance of missing some sites.

Another drawback of the conventional approach is the increased risk of damaging the Raman probe during the procedure.

Some embodiments of the present technology overcome the above drawbacks of conventional approaches to combining spectrometry and biopsy by providing a spectrometer (e.g. a Raman spectrometer) as described herein that collects light for analysis by way of an auxiliary water channel of an endoscope and a water jet. Such channels typically have a diameter of about 2.1 mm. This allows Raman and/or other spectrometry to be performed without obstructing a channel required for use of a biopsy instrument.

Another advantage of a water jet guided system as described herein is that the risk of patients being exposed to excessive amounts of laser radiation is reduced. There are standards which set maximum permissible exposure (MPE) values for laser radiation. For example, the American National Standards Institute (ANSI) has guidelines which provide MPE for laser light.

Without a water jet 110 the exposure of tissue to laser light varies significantly with probe to sample distance. Any slight deviation from the sampling distance toward the tissue can lead to patients being exposed to higher than desired doses of laser radiation.

With a water jet 110 as described herein, the variation in laser excitation power at a tissue surface is much reduced since the water jet 110 causes the spot size to be relatively independent of probe to sample distance. This decreases the risk of accidentally exceeding MPE limits. Another benefit of water jet 110 is that water jet 110 can absorb and dissipate extra heat induced by laser exposure. This feature may allow increases of MPE levels since tissue damage by overheating is made less likely.

In some embodiments a system as described herein includes an interlock that prevents light source 102 from emitting light or blocks or attenuates light from light source 102 unless water is being delivered to provide water jet 110. Apparatus according to some embodiments includes a cooler that cools water being supplied to water jet 110. Apparatus according to some embodiments includes a temperature controller that allows a temperature of water being supplied to water jet 110 to be controlled.

The present technology may be applied to a wide range of spectroscopy methods. The present technology is well adapted to be used for Raman spectroscopy. In Raman spectroscopy precise alignment of a Raman probe and water jet is not very critical. The water flow pattern will generally remain laminar even if the Raman probe is off center relative to water jet 110. In clinical practice it is best for the Raman probe to be centered with respect to water jet 110. This can be easily achieved to the required precision.

The attenuation of light in water is also a concern. However, for Raman spectroscopy or endoscopy, the attenuation of laser light and collected Raman signals in water jet 110 have been found to be negligible. For light from a narrow bandwidth continuous wave laser, absorption is believed to be the dominant factor in purified water. The amount of absorption in water jet 110 is dependent on the laser wavelength and probe-tissue distance. The absorption coefficient of water for light having a wavelength of 785 nm is 1.884 m$^{-1}$. The relationship between light transmission and probe-tissue distance follows the Beer-Lambert law. Table 1 lists light transmission for different path lengths in a water jet.

TABLE 1

| Attenuation of light in water jet | | | |
|---|---|---|---|
| Path length (mm) | Abs * path length | Transmission (%) | Attenuation (%) |
| 0 | 0 | 100 | 0 |
| 10 | 0.018 | 98.134 | 1.866 |
| 20 | 0.037 | 96.302 | 3.698 |
| 30 | 0.056 | 94.505 | 5.495 |
| 40 | 0.075 | 92.741 | 7.259 |

The attenuation of collected Raman scattered light is expected to be similar to that shown in Table 1 since Raman scattered light will be close in wavelength to the 785 nm excitation light. Therefore, it is estimated that a water jet 110 will transmit over 90% of light at 785 nm for water jet length of 50 mm or less. In real clinical application, the attenuation is estimated to be around 1.9% for a 10 mm water jet length. Therefore, the power of excitation light delivered through a water jet 110 to a tissue surface should be relatively stable for working distances of up to 40 mm away from the tissue surface.

Another issue when using a water jet in a Raman spectroscopy system is that water has a Raman signature peak. The major characteristic peak is around 1635 cm 1 in the low frequency (LF) region, and around 3430 cm$^{-1}$ in the high frequency (HF) region.

The experiments described above which obtained the Raman spectra for acetaminophen shown in FIG. 7 for the wavenumber range of 500 cm$^{-1}$–2000 cm$^{-1}$, did not find any obvious water peak at 1635 cm$^{-1}$. The experiment which obtained the in vivo skin Raman spectra shown in FIGS. 9A and 9B in the range of 550 to 1800 cm$^{-1}$ also did not include any obvious water peak. If a water peak is present, that water peak was probably not observed because it is dominated by a neighboring skin peak at 1655 cm$^{-1}$.

If water peaks are of concern then one or more filters may be provided to block wavenumbers corresponding to water peaks before collected light is provided to an analysis unit (e.g. spectrometer) 106. In addition or in the alternative, fingerprint regions of the Raman spectra may be selected that avoid the water peaks.

Another aspect of the invention provides endoscopes having integrated light guides that may be used for spectroscopy with or without water jets. The light guides may be separate from an instrument channel of the endoscope. This construction provides efficiencies in operation over cases in which a spectrometer probe (e.g. a Raman probe) is introduced through an instrument channel. With an endoscope that includes a separate integrated light guide for performing spectroscopic measurements it is not necessary to remove a probe from the instrument channel to facilitate procedures such as taking a biopsy. This can save a lot of time for a physician conducting an endoscopic exam as well as make endoscopic exams shorter and more comfortable for patients.

An endoscope may, for example, integrate a light guide of a type as illustrated in FIG. 2 or FIG. 3.

It can be appreciated that the present technology provides an efficient way to collect light from tissue and to guide that light to an analysis unit for analysis. This capability may be used for a wide range of different modalities. These modalities may differ from one another in the nature of light that is delivered to the tissue as well as the way in which resulting collected light is analyzed. An apparatus as described herein may be configured to perform one or multiple different modalities. These modalities may, for example include:
- Raman spectroscopy;
- fluorescence spectroscopy;
- multi-photon fluorescence spectroscopy; and,
- reflectance spectroscopy.

Where a component (e.g. a lens, filter, mirror, beam splitter, beam combiner, light detector, spectrograph, processor, assembly, device, etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Interpretation of Terms

Unless the context clearly requires otherwise, throughout the description and the claims:
- "comprise", "comprising", and the like are to be construed in an inclusive sense, as opposed to an exclusive or exhaustive sense; that is to say, in the sense of "including, but not limited to";
- "connected", "coupled", or any variant thereof, means any connection or coupling, either direct or indirect, between two or more elements; the coupling or connection between the elements can be physical, logical, or a combination thereof;
- "herein", "above", "below", and words of similar import, when used to describe this specification, shall refer to this specification as a whole, and not to any particular portions of this specification;
- "or", in reference to a list of two or more items, covers all of the following interpretations of the word: any of the items in the list, all of the items in the list, and any combination of the items in the list;
- the singular forms "a", "an", and "the" also include the meaning of any appropriate plural forms. These terms ("a", "an", and "the") mean one or more unless stated otherwise;
- "and/or" is used to indicate one or both stated cases may occur, for example A and/or B includes both (A and B) and (A or B);
- "approximately" when applied to a numerical value means the numerical value ±10%;
- where a feature is described as being "optional" or "optionally" present or described as being present "in some embodiments" it is intended that the present disclosure encompasses embodiments where that feature is present and other embodiments where that feature is not necessarily present and other embodiments where that feature is excluded. Further, where any combination of features is described in this application this statement is intended to serve as antecedent basis for the use of exclusive terminology such as "solely," "only" and the like in relation to the combination of features as well as the use of "negative" limitation(s)" to exclude the presence of other features; and
- "first" and "second" are used for descriptive purposes and cannot be understood as indicating or implying relative importance or indicating the number of indicated technical features.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a range for a value is stated, the stated range includes all sub-ranges of the range. It is intended that the statement of a range supports the value being at an endpoint of the range as well as at any intervening value to the tenth of the unit of the lower limit of the range, as well as any subrange or sets of sub ranges of the range unless the context clearly dictates otherwise or any portion(s) of the stated range is specifically excluded. Where the stated range includes one or both endpoints of the range, ranges excluding either or both of those included endpoints are also included in the invention.

Certain numerical values described herein are preceded by "about". In this context, "about" provides literal support for the exact numerical value that it precedes, the exact numerical value ±5%, as well as all other numerical values that are near to or approximately equal to that numerical value. Unless otherwise indicated a particular numerical value is included in "about" a specifically recited numerical value where the particular numerical value provides the substantial equivalent of the specifically recited numerical value in the context in which the specifically recited numerical value is presented. For example, a statement that something has the numerical value of "about 10" is to be interpreted as: the set of statements:
- in some embodiments the numerical value is 10;
- in some embodiments the numerical value is in the range of 9.5 to 10.5; and if from the context the person of ordinary skill in the art would understand that values within a certain range are substantially equivalent to 10 because the values with the range would be understood to provide substantially the same result as the value 10 then "about 10" also includes:
- in some embodiments the numerical value is in the range of C to D where C and D are respectively lower and upper endpoints of the range that encompasses all of those values that provide a substantial equivalent to the value 10

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

As will be apparent to those of skill in the art upon reading this disclosure, each of the individual embodiments described and illustrated herein has discrete components and features which may be readily separated from or combined with the features of any other described embodiment(s) without departing from the scope of the present invention.

Any aspects described above in reference to apparatus may also apply to methods and vice versa.

Any recited method can be carried out in the order of events recited or in any other order which is logically possible. For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, simultaneously or at different times.

Various features are described herein as being present in "some embodiments". Such features are not mandatory and may not be present in all embodiments. Embodiments of the invention may include zero, any one or any combination of two or more of such features. All possible combinations of such features are contemplated by this disclosure even where such features are shown in different drawings and/or described in different sections or paragraphs. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible). This is the case even if features A and B are illustrated in different drawings and/or mentioned in different paragraphs, sections or sentences.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A system useful for in vivo and ex vivo spectroscopy, the system comprising:
   a water source connected to supply water through a passage to an outlet at a flow rate sufficient to issue a laminar water jet from the outlet;
   a light source operative to emit light as a light beam that is guided to a sample by the water jet, wherein the outlet is spaced apart from the sample and the water jet exits the outlet to impinge on the sample;
   an analysis unit connected to receive collected light that has been emitted from the sample into the water jet and operable to analyze the collected light.

2. A system useful for in vivo and ex vivo spectroscopy, the system comprising:
   a water source connected to supply water through a passage to an outlet at a flow rate sufficient to issue a laminar water jet from the outlet;
   a light source operative to emit light as a light beam that is guided to a sample by the water jet;
   an analysis unit connected to receive collected light that has been emitted from the sample into the water jet and operable to analyze the collected light; and,
   an orientation sensor operable to provide an output signal indicating an orientation of the outlet wherein the water source is configured to vary a flow rate of the water supplied to the passage in response to the output signal from the orientation sensor.

3. A system useful for in vivo and ex vivo spectroscopy, the system comprising:
   a water source connected to supply water through a passage to an outlet at a flow rate sufficient to issue a laminar water jet from the outlet;
   a light source operative to emit light as a light beam that is guided to a sample by the water jet;
   an analysis unit connected to receive collected light that has been emitted from the sample into the water jet and operable to analyze the collected light,
   wherein a diameter of the water jet is constant to within 20% over a distance of 0 to 30 mm from the outlet.

4. The system according to claim 1 wherein the light emitted by the light source and the collected light have different wavelengths.

5. A system useful for in vivo and ex vivo spectroscopy, the system comprising:
   a water source connected to supply water through a passage to an outlet at a flow rate sufficient to issue a laminar water jet from the outlet;
   a light source operative to emit light as a light beam that is guided to a sample by the water jet;
   an analysis unit connected to receive collected light that has been emitted from the sample into the water jet and operable to analyze the collected light; and,
   a light guide that extends within the passage to a location at or near the outlet and the light beam from the light source is coupled into the light guide and the light beam coupled into the light guide is coupled into the water jet at a distal end of the light guide.

6. The system according to claim 5 comprising centralizing elements that center the light guide within the passage.

7. The system according to claim 5 wherein the light guide is arranged to receive the collected light from the water jet and to guide the collected light along an endoscope toward the analysis unit.

8. The system according to claim 7 wherein the light guide comprises a plurality of optical fibers wherein the light source is optically coupled to deliver the light from the light source into one or more first ones of the plurality of optical fibers and one or more second ones of the optical fibers are optically coupled to deliver the collected light to the analysis unit.

9. The system according to claim 1 comprising a second light source optically connected to emit a second light beam that is guided to the sample by the water jet wherein the second light beam comprises a white light source.

10. A system useful for in vivo and ex vivo spectroscopy, the system comprising:
    a water source connected to supply water through a passage to an outlet at a flow rate sufficient to issue a laminar water jet from the outlet;
    a light source operative to emit light as a light beam that is guided to a sample by the water jet;
    an analysis unit connected to receive collected light that has been emitted from the sample into the water jet and operable to analyze the collected light; and,
    a third light source optically connected to emit a third light beam that is guided to the sample by the water jet wherein the third light beam comprises light having a wavelength that excites fluorescence in tissue.

11. The system according to claim 10 comprising a second analysis unit optically connected to receive a portion of the collected light corresponding to the third light beam and operable to analyze the portion of the collected light corresponding to the third light beam.

12. A method for spectroscopy of a sample, the method comprising:
delivering water from a water source through a passage to an outlet at a flow rate sufficient to issue a laminar water jet from the outlet, wherein the outlet is spaced apart from the sample and the water jet exits the outlet to impinge on the sample;
delivering a light beam from a light source into the water jet;
directing collected light from the sample that has been collected and guided by the water jet to an analysis unit; and
operating the analysis unit to analyze the collected light.

13. A method for spectroscopy of a sample, the method comprising:
delivering water from a water source through a passage to an outlet at a flow rate sufficient to issue a laminar water jet from the outlet;
delivering a light beam from a light source into the water jet;
directing collected light from the sample that has been collected and guided by the water jet to an analysis unit; and
operating the analysis unit to analyze the collected light, wherein the collected light comprises Raman scattered light, the analysis unit comprises a Raman spectrometer and analyzing the collected light comprises producing a Raman spectrum of the collected light.

14. A method for spectroscopy of a sample, the method comprising:
delivering water from a water source through a passage to an outlet at a flow rate sufficient to issue a laminar water jet from the outlet;
delivering a light beam from a light source into the water jet;
directing collected light from the sample that has been collected and guided by the water jet to an analysis unit;
operating the analysis unit to analyze the collected light; and,
maintaining a velocity of the water in the water jet in the range of about 0.1 to 0.15 m/s.

15. A method for spectroscopy of a sample, the method comprising:
delivering water from a water source through a passage to an outlet at a flow rate sufficient to issue a laminar water jet from the outlet;
delivering a light beam from a light source into the water jet;
directing collected light from the sample that has been collected and guided by the water jet to an analysis unit;
operating the analysis unit to analyze the collected light; and,
delivering the water to the water jet at a flow rate in the range of about 3.0 to 4.5 ml/s.

16. A method for spectroscopy of a sample, the method comprising:
delivering water from a water source through a passage to an outlet at a flow rate sufficient to issue a laminar water jet from the outlet;
delivering a light beam from a light source into the water jet;
directing collected light from the sample that has been collected and guided by the water jet to an analysis unit;
operating the analysis unit to analyze the collected light; and,
guiding the collected light along the passage by total internal reflection at an interface between the water in the passage and a wall of the passage.

17. An endoscope comprising:
an elongated casing extending between a proximal end of the casing and an opposed distal end of the casing, the casing having an instrument channel extending longitudinally along the casing to the distal end of the casing; and
a light guide extending along the casing to the distal end of the casing in a lumen separate from the instrument channel, the light guide configured to receive light beam from a light source at the proximal end of the casing and to deliver collected light received by the light guide at the distal end of the casing to a proximal end of the light guide which is connectable to deliver the collected light to an analysis unit.

18. An endoscope comprising:
an elongated casing having an instrument channel extending longitudinally along the casing to a distal end of the casing; and
a light guide extending along the casing to the distal end of the casing in a lumen separate from the instrument channel, the light guide configured to receive light beam from a light source at a proximal end of the casing and to deliver collected light received by the light guide at the distal end of the casing to a proximal end of the light guide which is connectable to deliver the collected light to an analysis unit,
wherein the light guide comprises a water-filled passage having walls of a material that has an index of refraction significantly less than the index of refraction of water.

19. The endoscope according to claim 18 wherein the material of the wall of the water filled passage has an index of refraction of 1.29 or less.

20. The endoscope according to claim 17 wherein the light guide comprises a fiber bundle, the fiber bundle comprising a central fiber and a plurality of surrounding fibers, wherein the central fiber is configured to receive the light beam from the light source at the proximal end of the casing and the plurality of surrounding fibers is configured to collect sampled light from the sample near the distal end of the casing.

* * * * *